United States Patent
Miyano et al.

(10) Patent No.: US 8,098,625 B2
(45) Date of Patent: Jan. 17, 2012

(54) WIRELESS TERMINAL AND COMMUNICATION SYSTEM SWITCHING METHOD

(75) Inventors: Kentaro Miyano, Kanagawa (JP); Katsuaki Abe, Kanagawa (JP); Akihiko Matsuoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 592 days.

(21) Appl. No.: 11/568,773

(22) PCT Filed: Dec. 21, 2005

(86) PCT No.: PCT/JP2005/023481
§ 371 (c)(1),
(2), (4) Date: Nov. 7, 2006

(87) PCT Pub. No.: WO2006/087869
PCT Pub. Date: Aug. 24, 2006

(65) Prior Publication Data
US 2007/0223604 A1  Sep. 27, 2007

(30) Foreign Application Priority Data

Feb. 16, 2005 (JP) .................................. 2005-039192
Nov. 22, 2005 (JP) .................................. 2005-337346

(51) Int. Cl.
*H04W 4/00* (2009.01)
(52) U.S. Cl. ........ 370/330; 370/320; 370/335; 375/326; 375/260
(58) Field of Classification Search .................. 370/330, 370/320, 335; 375/326, 260
See application file for complete search history.

(56) References Cited

U.S. PATENT DOCUMENTS

| | | | |
|---|---|---|---|
| 6,744,828 B1 * | 6/2004 | Uchiyama et al. | 375/326 |
| 7,012,908 B2 * | 3/2006 | Sasaki | 370/335 |
| 7,212,793 B2 * | 5/2007 | Kogawa et | 455/132 |
| 7,447,277 B2 * | 11/2008 | Yajima et al. | 375/326 |
| 2004/0071105 A1 * | 4/2004 | Maeda et al. | 370/320 |

(Continued)

FOREIGN PATENT DOCUMENTS

JP   2001-320346 A   11/2001

(Continued)

OTHER PUBLICATIONS

International Search Report for PCT/JP2005/023481.

(Continued)

*Primary Examiner* — Charles Appiah
*Assistant Examiner* — Alexander Yi
(74) *Attorney, Agent, or Firm* — Pearne & Gordon LLP

(57) ABSTRACT

A wireless terminal involving small redundancy that can be reconfigured to a configuration compatible with a plurality of systems using the hardware resources compatible with one system is provided.
A wireless terminal 100A is compatible with an OFCDM system and has a signal processing section 151, a synchronous detection section 162, etc. The signal processing section 151 performs Fourier transform when the wireless terminal is compatible with the OFCDM system; the signal processing section 151 performs Fourier transform and inverse Fourier transform compatible with an OFDM system when the wireless terminal is compatible with the OFDM system and a CDMA system. When the wireless terminal is compatible with the OFCDM system, the synchronous detection section 162 uses taps used in the systems when the wireless terminal is compatible with the OFDM system and the CDMA system. When the wireless terminal 100A is placed out of the area in the OFCDM system, it is switched to a configuration compatible with the OFDM system and the CDMA system.

6 Claims, 14 Drawing Sheets

U.S. PATENT DOCUMENTS

2004/0141481 A1\* 7/2004 Lee et al. ............... 370/335
2007/0165700 A1\* 7/2007 Chin Po Shin et al. ....... 375/147

FOREIGN PATENT DOCUMENTS

| | | | |
|---|---|---|---|
| JP | 2003-234789 | A | 8/2003 |
| JP | 2003-318999 | | 11/2003 |
| JP | 2004-096445 | A | 3/2004 |
| JP | 2004-158901 | A | 6/2004 |
| JP | 2004-186852 | A | 7/2004 |
| JP | 2004-527166 | A | 9/2004 |

OTHER PUBLICATIONS

Sawahashi et al., "Kahen Kakuchoritsu o Mochiiru Broadband TD-OFCDM Packet Denso", 2001 The Institute of Electroics, Information and Communication Engineers Sogo Taikai Koen Ronbunshu, Tsushin 1, p. 495.

"Nikkei Electronics", Oct. 7, 2002, p. 129-138.

\* cited by examiner

WIRELESS TERMINAL AND COMMUNICATION SYSTEM SWITCHING METHOD

TECHNICAL FIELD

This invention relates to a wireless terminal and a communication system switching method compatible with a plurality of communication systems.

BACKGROUND ART

Hitherto, a modulation circuit, a demodulation circuit, and a wireless unit designed to be able to flexibly compatible with a plurality of modulation-demodulation systems have been known as a wireless terminal compatible with a plurality of communication systems (for example, refer to patent document 1).

FIG. 16 is a block diagram showing a transmitter as a wireless unit compatible with a plurality of communication systems in a related art described in patent document 1. In FIG. 16, the transmitter includes a modulation circuit 1100 for providing various types of modulation functions, an LPF 1117 for limiting the band of a baseband signal (made up of an I signal and a Q signal) output from the modulation circuit 1100, a quadrature modulator 1118 for converting the baseband signal whose band is limited into an IF signal, an up converter 1119 for converting the frequency of the IF signal provided by the quadrature modulator 1118 into a transmission frequency based on a local signal from a local oscillator 1120, a power amplifier 1121 for amplifying the power of the transmission signal whose frequency is converted into the transmission frequency, and a transmission antenna 1122.

The modulation circuit 1100 includes a QPSK modulation circuit 1102, an 8PSK modulation circuit 1103, a 64QAM modulation circuit 1104, a spread modulation circuit 1107, a first OFDM modulation circuit 1110, a second OFDM modulation circuit 1111, switches 1101, 1105, 1106, 1108, 1109, and 1112 for switching the modulation circuit connection relationship, a modulation control circuit 1115 for controlling the switches to switch the modulation circuits, thereby making it possible to be flexibly compatible with a plurality of communication systems, a power control circuit 1114 for controlling power supply to the modulation circuits, and a D/A converter 1113.

Development of a communication system in preparation for next-generation mobile communication service (fourth-generation mobile communication service) is started and an art of using VSF-OFCDM system in the down direction from a base station to the user and using MC (multicarrier)/DS-CDMA system with two carriers in the up direction is proposed (refer to non-patent document 1).

Patent document 1: JP-A-2003-318999 (FIG. 1)
Non-patent document 1: "Nikkei Electronics" 2002 Oct. 7 issue, p129-p138

Disclosure of the Invention

Problems to be Solved by the Invention

However, in the wireless unit in the related art described in patent document 1 has a plurality of modulation-demodulation sections for the wireless unit to be compatible with a plurality of communication systems and when communications are conducted using one communication system, the modulation-demodulation section incompatible with the communication system is not used and thus the hardware configuration involves large redundancy; this is a problem. For example, for the wireless unit to be compatible with both of OFDM (Orthogonal Frequency Division Multiplexing) system and CDMA (Code Division Multiple Access) system, a hardware configuration of large redundancy compatible with both the communication systems is required.

It is therefore an object of the invention to provide a wireless terminal and a communication system switching method capable of implementing a configuration of small redundancy to be compatible with a plurality of systems using the hardware resources compatible with one system.

Means for Solving the Problems

A wireless terminal of the invention includes hardware resources of a wireless terminal compatible with an OFCDM (Orthogonal Frequency And Code Division Multiplexing) system, and is reconfigured to a configuration compatible with both of an OFDM (Orthogonal Frequency Division Multiplexing) system and a CDMA (Code Division Multiple Access) system with the hardware resources of the wireless terminal.

According to the described configuration, it is made possible to implement a configuration of small redundancy to be compatible with a plurality of communication systems using the hardware resources compatible with one system.

As the wireless terminal of the invention, the wireless terminal compatible with the OFCDM system has a synchronous detection section and this synchronous detection section performs synchronous detection compatible with both of the OFDM system and the CDMA system.

According to the described configuration, the synchronous detection section can perform synchronous detection processing compatible with both of the OFDM system and the CDMA system, so that it is made possible to implement a configuration of small redundancy to be compatible with a plurality of communication systems.

As the wireless terminal of the invention, the wireless terminal compatible with the OFCDM system has a Fourier transform section and this Fourier transform section performs Fourier transform or inverse Fourier transform compatible with the OFDM system.

According to the described configuration, the Fourier transform section can perform Fourier transform or inverse Fourier transform processing compatible with the OFDM system, so that it is made possible to implement a configuration of small redundancy to be compatible with a plurality of communication systems.

As the wireless terminal of the invention, the wireless terminal compatible with the OFCDM system has a Fourier transform section and this Fourier transform section performs Fourier transform or inverse Fourier transform compatible with a plurality of OFDM systems as the OFDM system.

According to the described configuration, the Fourier transform section can perform Fourier transform or inverse Fourier transform processing compatible with a plurality of OFDM systems, so that it is made possible to implement a configuration of small redundancy to be compatible with a plurality of communication systems.

As the wireless terminal of the invention, the wireless terminal compatible with the OFCDM system has an inverse spread section and this inverse spread section performs inverse spread compatible with the CDMA system.

According to the described configuration, the inverse spread section can perform inverse spread processing compatible with the CDMA system, so that it is made possible to implement a configuration of small redundancy to be compatible with a plurality of communication systems.

As the wireless terminal of the invention, the wireless terminal compatible with the OFCDM system has a channel estimation section and this channel estimation section performs channel estimation compatible with both of the OFDM system and the CDMA system.

According to the described configuration, the channel estimation section can perform channel estimation compatible with the OFDM system and the CDMA system, so that it is made possible to implement a configuration of small redundancy to be compatible with a plurality of communication systems.

As the wireless terminal of the invention, the wireless terminal compatible with the OFCDM system has a filter section and this filter section performs filter operation compatible with the OFDM system.

According to the described configuration, the filter section can perform the filter operation compatible with the OFDM system, so that it is made possible to implement a configuration of small redundancy to be compatible with a plurality of communication systems.

In the wireless terminal of the invention, if the wireless terminal compatible with the OFCDM system is placed out of the communication area of the OFCDM system, the hardware resources of the wireless terminal are reconfigured to the configuration compatible with both of the OFDM system and the CDMA system.

According to the described configuration, if the wireless terminal is placed out of the communication area of the OFCDM system, wireless communications compatible with both of the CDMA system and the OFDM system can be conducted.

In the wireless terminal of the invention, if the wireless terminal compatible with the OFCDM system is placed out of the communication area of the OFCDM system, the synchronous detection section is reconfigured to the configuration compatible with both of the OFDM system and the CDMA system.

According to the described configuration, if the wireless terminal is placed out of the communication area of the OFCDM system, wireless communications compatible with both of the CDMA system and the OFDM system can be conducted.

In the wireless terminal of the invention, the OFCDM system is a VSF-OFCDM system. Accordingly, it is made possible to reconfigure to the configuration compatible with both of the OFDM system and the CDMA system using the hardware resources compatible with the VSF-OFCDM system and conduct wireless communications compatible with both of the OFDM system and the CDMA system in the configuration of small redundancy.

In the wireless terminal of the invention, the CDMA system is a W-CDMA system. Accordingly, it is made possible to conduct wireless communications compatible with the W-CDMA system as well as the OFDM system in the configuration of small redundancy.

In the wireless terminal of the invention, the OFDM system is an IEEE802.11a system. Accordingly, it is made possible to conduct wireless communications compatible with the IEEE802.11a system as well as the CDMA system in the configuration of small redundancy.

In the wireless terminal of the invention, the OFDM system is an ISDB-T system. Accordingly, it is made possible to conduct wireless communications compatible with the ISDB-T system as well as the CDMA system in the configuration of small redundancy.

The communication system switching method of the invention is a communication system switching method in a wireless terminal including hardware resources of a wireless terminal compatible with an OFCDM (Orthogonal Frequency And Code Division Multiplexing) system, the communication system switching method of reconfigureing to a configuration compatible with both of an OFDM (Orthogonal Frequency Division Multiplexing) system and a CDMA (Code Division Multiple Access) system using the hardware resources of the wireless terminal.

Accordingly, the communication system can be switched so as to be compatible with a plurality of communication systems (OFDM system and CDMA system) using the hardware resources compatible with one system (OFCDM system) and wireless communications in a plurality of communication systems can be conducted in the configuration of small redundancy.

In the communication system switching method of the invention, if the wireless terminal compatible with the OFCDM system is placed out of the communication area of the OFCDM system, the wireless terminal is reconfigured to a configuration compatible with both of the OFDM system and the CDMA system.

Accordingly, if the wireless terminal is placed out of the communication area of the OFCDM system, the communication system can be switched so as to be compatible with both of the CDMA system and the OFDM system and wireless communications in the CDMA system and the OFDM system can be conducted.

In the communication system switching method of the invention, if the wireless terminal compatible with the OFCDM system is placed out of the communication area of the OFCDM system, the synchronous detection section is reconfigured to the configuration compatible with both of the OFDM system and the CDMA system.

Accordingly, if the wireless terminal is placed out of the communication area of the OFCDM system, the communication system can be switched so as to be compatible with both of the CDMA system and the OFDM system and wireless communications in the CDMA system and the OFDM system can be conducted. Advantages of the Invention According to the invention, there can be provided a wireless terminal and a communication system switching method capable of implementing a configuration of small redundancy to be compatible with a plurality of systems using the hardware resources compatible with one system.

Figure 1:
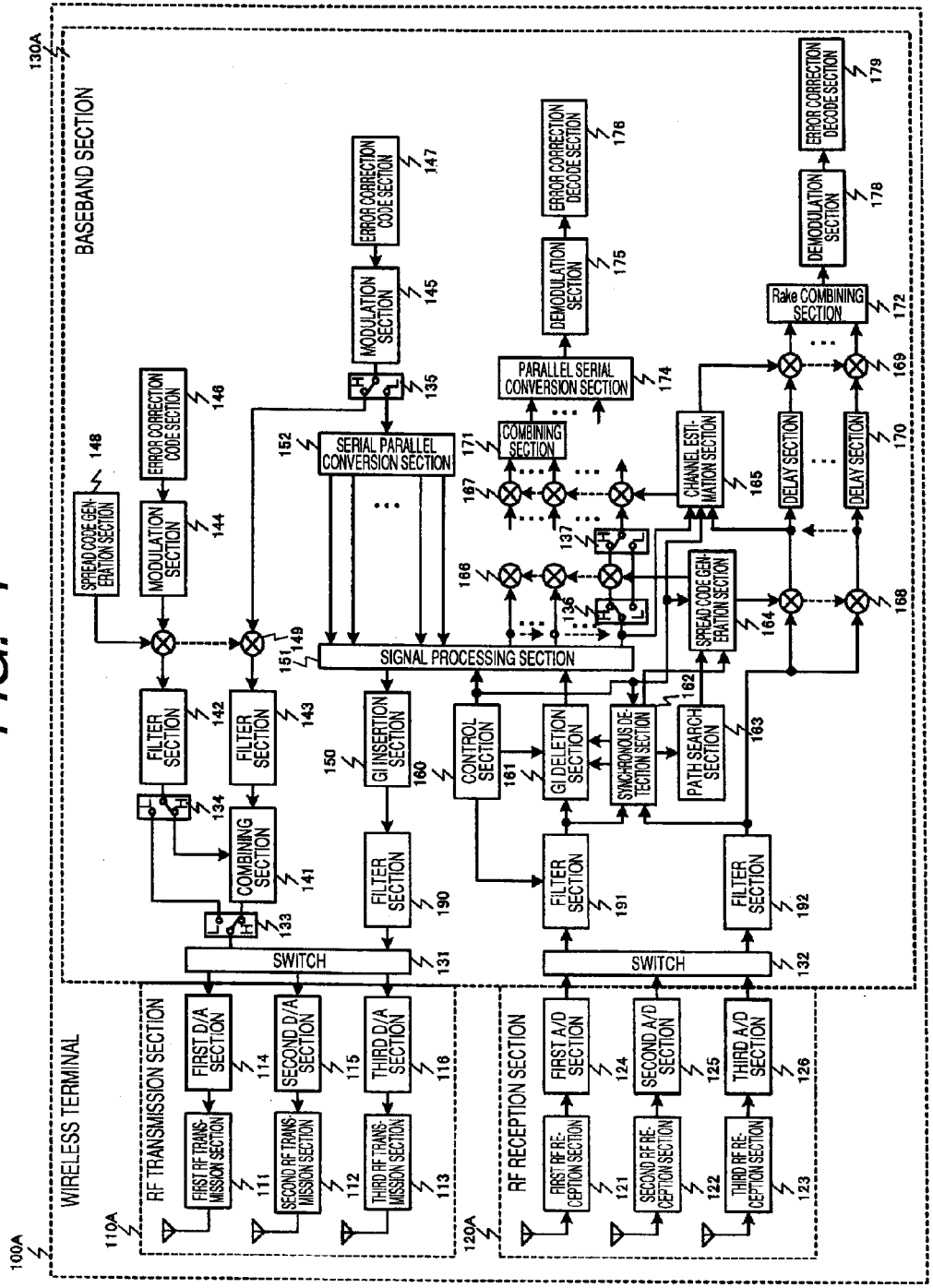
FIG. 1 is a block diagram to show the configuration of a wireless terminal in a first embodiment of the invention.

DESCRIPTION of REFERENCE NUMERALS 100a-100d Wireless terminal
110a-110d RF transmission section
111-113 RF transmission section
114-116 D/A section
120A-120D RF reception section
121-123, 122B, 123C, 127 RF reception section
124-126, 125B, 126C, 128 A/D section
130A-130D Baseband section
131-139 Switch
141 Combining section
142, 143, 190-192, 192C Filter section
144 145 Modulation section
146, 147 Error correction code section
148 Error correction code section
149 Multiplication section
150 Guard interval (GI) insertion section
151, 151C Signal processing section
152 Serial parallel conversion section
160 Control section
161, 180 Guard interval (GI) deletion section
162, 162D Synchronous detection section
163 Path search section
164 Spread code generation section
165 Channel estimation section
166-169 Multiplication section
170 Delay section
171 Combining section
172 Rake combining section
174 Parallel serial conversion section
175, 175D, 178 Demodulation section
176, 179 Error correction decode section
1511, 1512, 1513 Butterfly computation section
1621, 1624 OFDM synchronous detection section
1622 CDMA synchronous detection section
1625 Addition section
195 Propagation environment estimation section

BEST MODE FOR CARRYING OUT THE INVENTION

In the following embodiments, examples of wireless terminals reconfigured so as to be compatible with both of an OFDM (Orthogonal Frequency Division Multiplexing) system and a CDMA (Code Division Multiple Access) system using hardware resources of an OFCDM (Orthogonal Frequency And Code Division Multiplexing) system are shown.

First Embodiment

FIG. 1 is a block diagram to show the configuration of a wireless terminal in a first embodiment of the invention. In FIG. 1, a wireless terminal 100A of the first embodiment is made up of an RF transmission section 110A, an RF reception section 120A, and a baseband section 130A.

The RF transmission section 110A has a first RF transmission section 111, a second RF transmission section 112, a third RF transmission section 113, a first D/A section 114, a second D/A section 115, and a third D/A section 116.

The RF reception section 120A has a first RF reception section 121, a second RF reception section 122, a third RF reception section 123, a first A/D section 124, a second A/D section 125, and a third A/D section 126.

The baseband section 130A has a switch 131, a switch 132, a switch 133, a switch 134, a switch 135, a switch 136, a switch 137, a combining section 141, a filter 142, a filter 143, a filter 190, a filter 191, a filter 192, a modulation section 144, a modulation section 145, an error correction code section 146, an error correction code section 147, a spread code generation section 148, a multiplication section 149, a guard interval insertion section (GI insertion section) 150, a signal processing section 151, a serial parallel conversion section 152, a control section 160, a guard interval deletion section (GI deletion section) 161, a synchronous detection section 162, a path search section 163, a spread code generation section 164, a channel estimation section 165, a multiplication section 166, a multiplication section 167, a multiplication section 168, a multiplication section 169, a delay section 170, a combining section 171, Rake combining section 172, a parallel serial conversion section 174, a demodulation section 175, an error correction decode section 176, a demodulation section 178, and an error correction decode section 179.

The embodiment is compatible with VSF-OFCDM (Variable Spreading Factor) system as the OFCDM system, W-CDMA (Wideband-Code Division Multiple Access) as the CDMA system, and IEEE802.11a system as the OFDM system.

The first RF transmission section 111 and the first D/A section 114 in the RF transmission section 110A are an RF section compatible with the VSF-OFCDM system. The first D/A section 114 converts an input digital signal modulated according to the VSF-OFCDM system into an analog signal and outputs the analog signal, and the first RF transmission section 111 converts the input analog signal into a radio frequency signal and outputs the radio frequency signal. The second RF transmission section 112 and the second D/A section 115 are an RF section compatible with the IEEE802.11a system. The second D/A section 115 converts an input digital signal modulated according to the IEEE802.11a system into an analog signal and outputs the analog signal, and the second RF transmission section 112 converts the input analog signal into a radio frequency signal and outputs the radio frequency signal. The third RF transmission section 113 and the third D/A section 116 are an RF section compatible with the W-CDMA system. The third D/A section 116 converts an input digital signal modulated according to the W-CDMA system into an analog signal and outputs the analog signal, and the third RF transmission section 113 converts the input analog signal into a radio frequency signal and outputs the radio frequency signal.

The first RF reception section 121 and the first A/D section 124 in the RF reception section 120A are an RF section compatible with the VSF-OFCDM system. The first RF reception section 121 converts an input radio frequency signal according to the VSF-OFCDM system into an analog signal of an intermediate frequency and outputs the analog signal, and the first A/D section 124 converts the input analog signal into a digital signal and outputs the digital signal. The second RF reception section 122 and the second A/D section 125 are an RF section compatible with the IEEE802.11a system. The second RF reception section 122 converts an input radio frequency signal according to the IEEE802.11a system into an analog signal of an intermediate frequency and outputs the analog signal, and the second A/D section 125 converts the input analog signal into a digital signal and outputs the digital signal. The third RF reception section 123 and the third A/D section 126 are an RF section compatible with the W-CDMA system. The third RF reception section 123 converts an input radio frequency signal according to the W-CDMA system into an analog signal of an intermediate frequency and outputs the analog signal, and the third A/D section 126 converts the input analog signal into a digital signal and outputs the digital signal.

The switches 131, 132, 133, 134, 135, 136, and 137 are controlled by the control section 160 although connection is not shown in FIG. 1. Each of the switches 133, 134, 135, 136, and 137 is H when the wireless terminal 100A conducts communications in the VSF-OFCDM system; each switch is switched L when the wireless terminal 100A conducts communications in the IEEE802.11a system and the W-CDMA system. When each of the switches 136 and 137 is H, a signal output from the signal processing section 151 is multiplied by an inverse spread signal output from the spread code generation section 164; when the switch is L, a signal output from the signal processing section 151 is not multiplied by any. The switch 131 switches so that the first D/A section 114 and the switch 133 are connected when the wireless terminal 100A conducts communications in the VSF-OFCDM system and that the second D/A section 115 and the filter section 190 are connected and the third D/A section 116 and the switch 133 are connected when the wireless terminal 100A conducts communications in the IEEE802.11a system and the W-CDMA system. The switch 132 switches so that the first A/D section 124 and the filter section 191 are connected when the wireless terminal 100A conducts communications in the VSF-OFCDM system and that the second A/D section 125 and the filter section 191 are connected and the third A/D section 126 and the filter section 192 are connected when the wireless terminal 100A conducts communications in the IEEE802.11a system and the W-CDMA system.

The signal processing section 151, the guard interval deletion section 161, the synchronous detection section 162, the spread code generation section 164, the channel estimation section 165, and the filter section 191 are also connected by the control section 160.

The signal processing section 151 is a block for performing Fourier transform and inverse Fourier transform and when the wireless terminal 100A conducts communications in the VSF-OFCDM system, the signal processing section 151 performs 1024-point Fourier transform for the signal input from the guard interval deletion section 161 and outputs the result to the multiplication section 166 (switch 136). When the wireless terminal 100A conducts communications in the IEEE802.11a system and the W-CDMA system, the signal processing section 151 performs 64-point inverse Fourier transform for the signal input from the serial parallel conversion section 152 and outputs the result to the guard interval insertion section 150 and performs 64-point Fourier transform for the signal input from the guard interval deletion section 161 and outputs the result to the switch 136. The signal processing section 151 needs only to cover 1024-point Fourier transform and 64-point Fourier transform and inverse Fourier transform and therefore can execute the processing as radix-4 butterfly computation.

Figure 2:
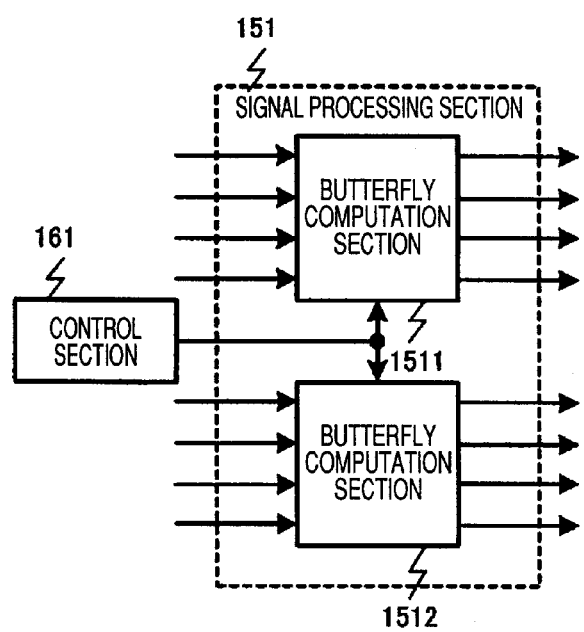
FIG. 2 is a drawing to show a configuration example of a signal processing section in the first embodiment of the invention.

FIG. 2 shows a configuration example of the signal processing section 151. In FIG. 2, the signal processing section 151 has a butterfly computation section 1511 and a butterfly computation section 1512 for executing radix-4 butterfly computation. When the wireless terminal 100A conducts communications in the VSF-OFCDM system, the butterfly computation sections 1511 and 1512 perform 1024-point FFT (Fast Fourier Transform). When the wireless terminal 100A conducts communications in the IEEE802.11a system and the W-CDMA system, the butterfly computation section 1511 performs 64-point IFFT (Inverse Fast Fourier Transform) and the butterfly computation section 1512 performs 64-point FFT. However, the signal processing section 151 is not limited to the radix-4 butterfly computation and is not limited to the configuration example in FIG. 2 if it has a configuration capable of executing 64-point inverse Fourier transform and Fourier transform and 1024-point Fourier transform.

As shown in FIG. 1, the guard interval deletion section 161 has a function of removing a guard interval from the digital signal input from the first A/D section 124 or the second A/D section 125 through the filter section 191 based on timing information input from the synchronous detection section 162. When the wireless terminal 100A conducts communications in the VSF-OFCDM system, a 226-point guard interval is removed from the digital signal input from the first A/D section 124 through the filter section 191; when the wireless terminal 100A conducts communications in the IEEE802.11a system and the W-CDMA system, a 16-point guard interval is removed from the digital signal input from the second A/D section 125 through the filter section 191.

Figure 3:
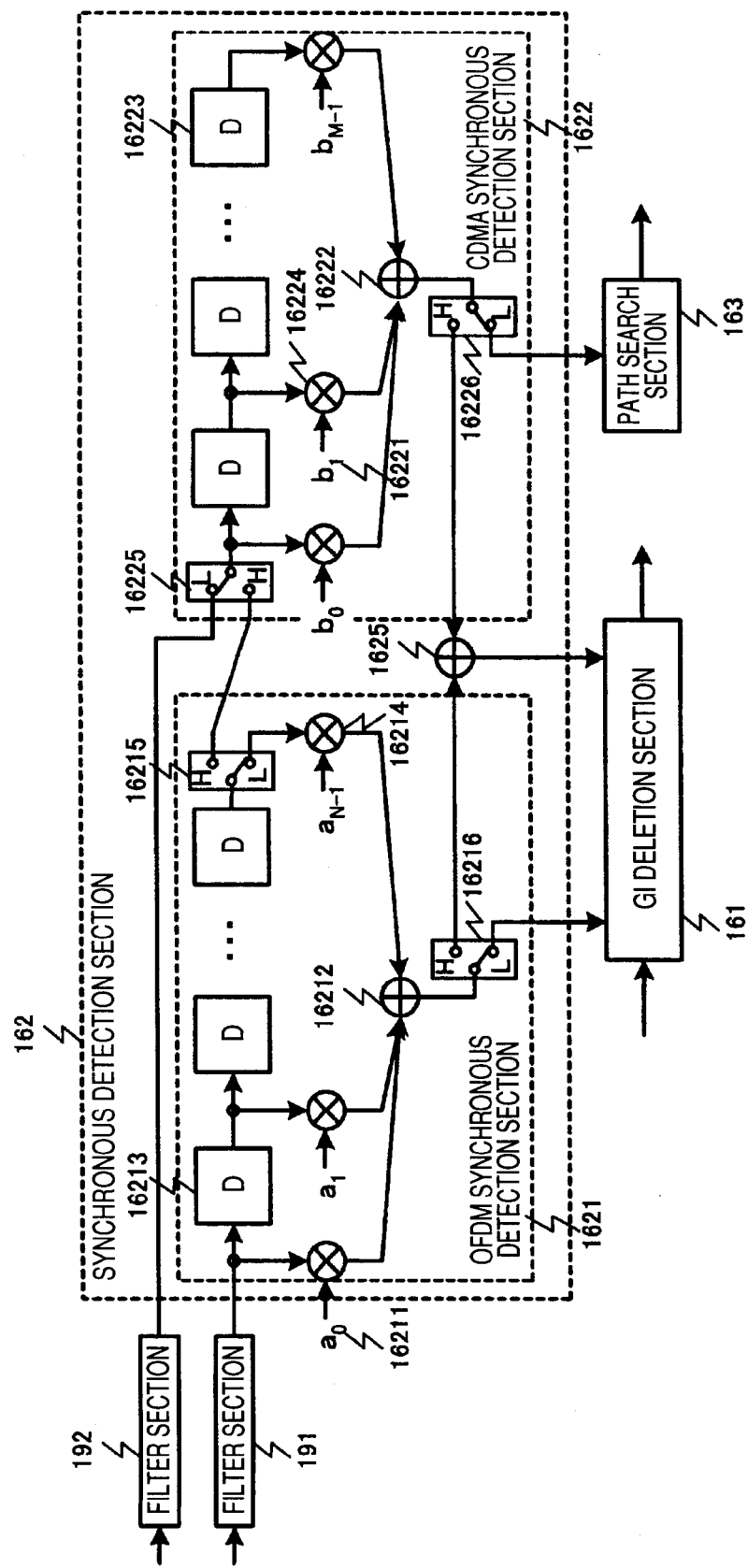
FIG. 3 is a drawing to show a configuration example of a synchronous detection section in the first embodiment of the invention.

The synchronous detection section 162 has a function of detecting the timing of a symbol, etc., required for removal of the guard interval or inverse spreading. FIG. 3 shows a configuration example of the synchronous detection section 162. FIG. 3 shows the configuration for detecting the timing based on cross correlation when the number of taps (=A) required for performing synchronous processing when communications are conducted in the VSF-OFCDM system is equal to the sum total of the number of taps (=N) required for performing synchronous processing in the IEEE802.11a system and the number of taps (=M) required for performing synchronous processing in the W-CDMA system (A=N+M) when communications are conducted in the IEEE802.11a system and the W-CDMA system.

In FIG. 3, the synchronous detection section 162 has an OFDM synchronous detection section 1621, a CDMA synchronous detection section 1622, and an addition section 1625. The OFDM synchronous detection section 1621 has a tap coefficient 16211, an addition section 16212, a delay section 16213, a multiplication section 16214, a switch 16215, and a switch 16216. The CDMA synchronous detection section 1622 has a tap coefficient 16221, an addition section 16222, a delay section 16223, a multiplication section 16224, a switch 16225, and a switch 16226. Each of the switches 16215, 16216, 16225, and 16226 is H when the wireless terminal 100A conducts communications in the VSF-OFCDM system; each switch is switched L when the wireless terminal 100A conducts communications in the IEEE802.11a system and the W-CDMA system. The tap coefficients 16211 and 16221 are switched to coefficients corresponding to the communication systems with switching of the switches. To conduct communications in the IEEE802.11a system and the W-CDMA system, the digital signal (IEEE802.11a system) output from the filter section 191 is input to the delay section 16213, the digital signal (W-CDMA system) output from the filter section 192 is input to the delay section 16223, and timing information is output from the switches 16216 and 16226 of the OFDM synchronous detection section 1621 and the CDMA synchronous detection section 1622. To conduct communications in the VSF-OFCDM system, the digital signal (VSF-OFCDM system) input from the filter section 191 is input to the delay sections 16213 and 16223, the signals output from the OFDM synchronous detection section 1621 and the CDMA synchronous detection section 1622 are added by the addition section 1625, and timing information is output.

Figure 4:
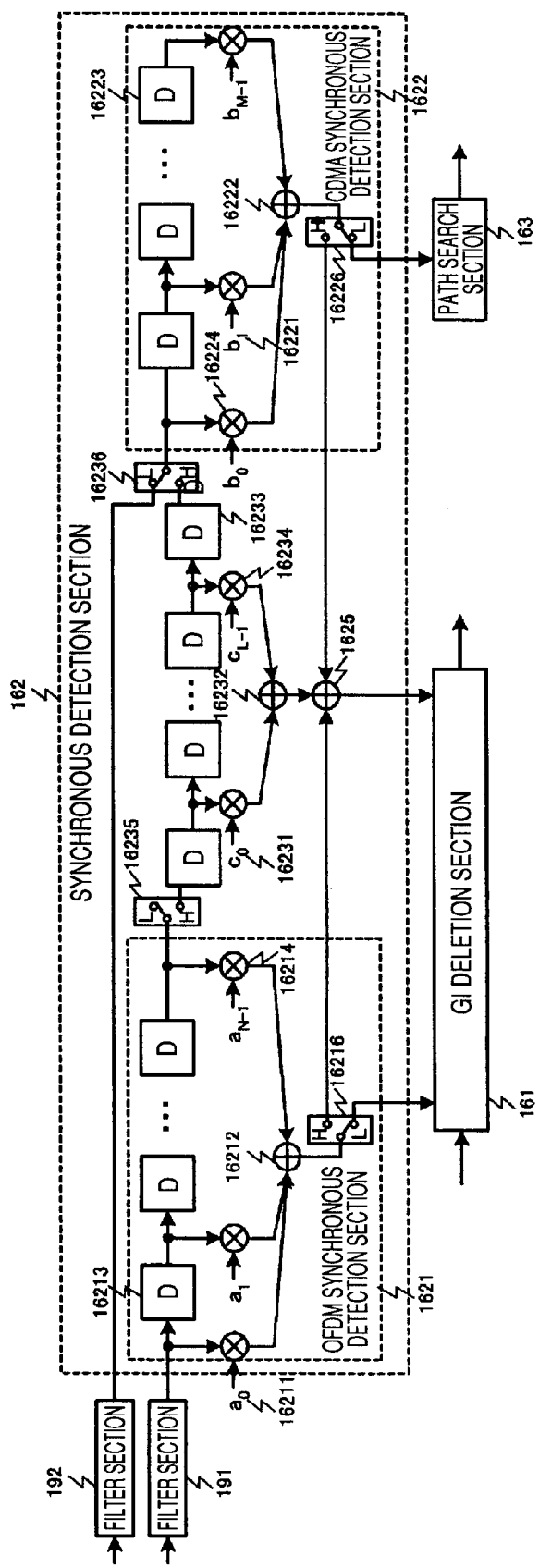
FIG. 4 is a drawing to show a configuration example of the synchronous detection section in the first embodiment of the invention.

FIG. 4 shows a configuration example of the synchronous detection section 162 when the number of taps A is larger than N+M (A=N+M+L). The synchronous detection section 162 shown in FIG. 4 further has a tap coefficient 16231, an addition section 16232, a delay section 16233, a multiplication section 16234, a switch 16235, and a switch 16236 as compared with the configuration example in FIG. 3. The switches 16235 and 16236 are H when the wireless terminal 100A conducts communications in the VSF-OFCDM system; when the digital signal (VSF-OFCDM system) output from the filter section 191 is input to the delay sections 16213, 16233, and 16223 and communications are conducted in the IEEE802.11a system and the W-CDMA system, the switches are switched L and the digital signal (IEEE802.11a system) output from the filter section 191 is input to the delay section 16213 and the digital signal (W-CDMA system) output from the filter section 192 is input to the delay section 16223.

Figure 5:
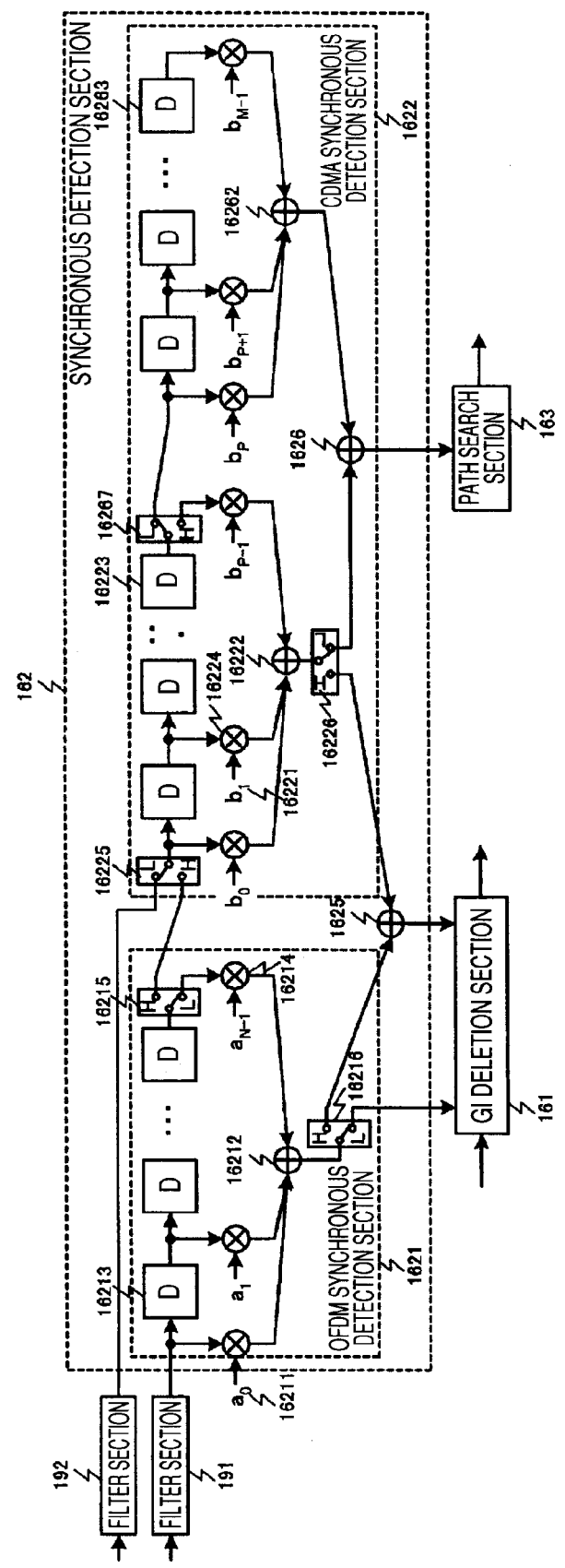
FIG. 5 is a drawing to show a configuration example of the synchronous detection section in the first embodiment of the invention.

FIG. 5 shows a configuration example of the synchronous detection section 162 when the number of taps A is smaller than N+M (A=N+P). The synchronous detection section 162 shown in FIG. 5 further has an addition section 1626, an addition section 16262, a delay section 16263, and a switch 16267 as compared with the configuration example in FIG. 3. The switch 16267 is H when the wireless terminal 100A conducts communications in the VSF-OFCDM system; when the digital signal (VSF-OFCDM system) output from the filter section 191 is input to the delay sections 16213 and 16223 and communications are conducted in the IEEE802.11a system and the W-CDMA system, the switch is switched L and the digital signal (IEEE802.11a system) output from the filter section 191 is input to the delay section 16213 and the digital signal (W-CDMA system) output from the filter section 192 is input to the delay sections 16223 and 16263.

However, the synchronous detection section 162 can also detect the timing based on auto correlation by using the digital signal input to the delay section instead of the tap coefficient.

As shown in FIG. 1, when the wireless terminal 100A conducts communications in the VSF-OFCDM system, the spread code generation section 164 generates inverse spread code based on the timing information detected by the synchronous detection section 162; when the wireless terminal 100A conducts communications in the IEEE802.11a system and the W-CDMA system, the spread code generation section 164 generates inverse spread code based on the timing information output from the path search section 163 for selecting the path required for reception from a delay profile corresponding to the W-CDMA system. Since the inverse spread code used in the VSF-OFCDM system and the W-CDMA system is common, the spread code generation section 164 can be shared between the two systems.

Figure 6:
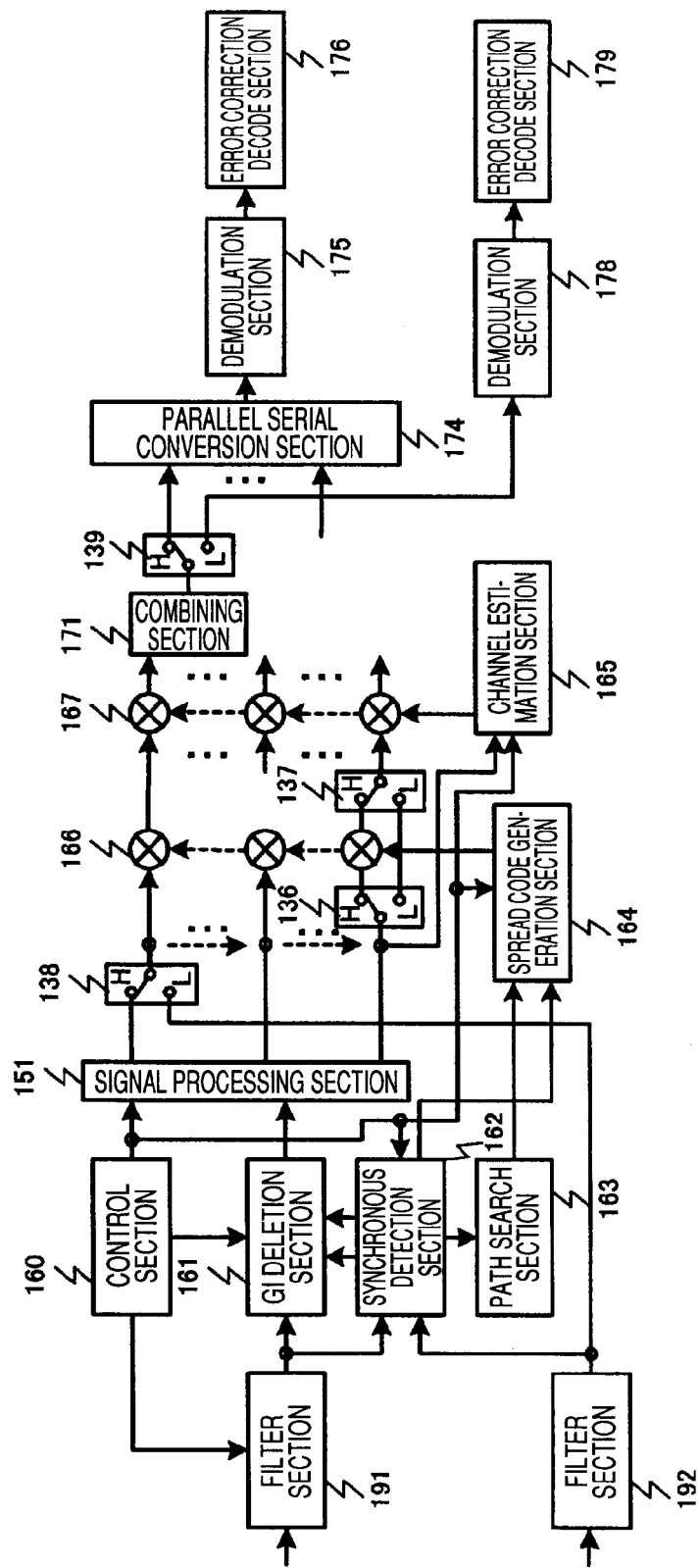
FIG. 6 is a drawing to show a configuration example of an inverse spread section in the first embodiment of the invention.

The multiplication sections 166 and 168 output the value provided by multiplying the inverse spread code by an input signal. Since the number of the multiplication sections 166 used for inverse spreading of a signal in the VSF-OFCDM system is greater than the number of the multiplication sections 168 used for inverse spreading of a signal in the W-CDMA system, the baseband section 130A is provided with switches 138 and 139 as shown in FIG. 6, whereby the multiplication section 166 can be shared between the two systems. The switches 138 and 139 are H when the wireless terminal 100A conducts communications in the VSF-OFCDM system; the switches are L when the wireless terminal 100A conducts communications in the IEEE802.11a system and the W-CDMA system.

The channel estimation section 165 has a function of estimating a transmission line distortion (amplitude, phase) using a known pilot symbol or preamble signal. The channel estimation section 165 basically is made up of delay sections and a tap coefficient like the synchronous detection section 162. The number of the delay sections of the channel estimation section 165 is matched with the system having a larger number of the delay sections in the channel estimation section used for channel estimation of a signal in the VSF-OFCDM system and the channel estimation section used for channel estimation of a signal in the IEEE802.11a system and the W-CDMA system, whereby a configuration similar to that in FIG. 3, FIG. 4, FIG. 5 is provided, so that the channel estimation section can be shared among the three systems.

The demodulation section 175 performs demapping processing for an input signal. When the wireless terminal 100A conducts communications in the VSF-OFCDM system, the demodulation section 175 is compatible with QPSK, 16QAM, and 64QAM; when the wireless terminal 100A conducts communications in the IEEE802.11a system and the W-CDMA system, the demodulation section 175 is compatible with BPSK, QPSK, 16QAM, and 64QAM in the IEEE802.11a system. The demodulation section 175 is configured to be compatible with BPSK, QPSK, 16QAM, and 64QAM, whereby it can be shared between the two systems. The demodulation section 178 has a similar function to that of the demodulation section 175 and is compatible with QPSK in the W-CDMA system when the wireless terminal 100A conducts communications in the IEEE802.11a system and the W-CDMA system.

The error correction decode section 176 performs decoding processing for an input signal. When the wireless terminal 100A conducts communications in the VSF-OFCDM system, turbo decoding and Viterbi decoding are performed; when the wireless terminal 100A conducts communications in the IEEE802.11a system and the W-CDMA system, Viterbi decoding compatible with the IEEE802.11a system is performed. The error correction decode section 176 is implemented as a reconfigurable device such as an FPGA (Field Programmable Gate Array) and covers the turbo decoding and the Viterbi decoding, whereby it can be shared between the two systems. The error correction decode section 179 has a similar function to that of the error correction decode section 176 and covers turbo decoding and Viterbi decoding in the W-CDMA system when the wireless terminal 100A conducts communications in the IEEE802.11a system and the W-CDMA system.

The filter sections 142, 143, and 192 are root Nyquist filters compatible with the W-CDMA system when the wireless terminal 100A conducts communications in the IEEE802.11a system and the W-CDMA system. The filter section 190 is a filter compatible with the IEEE802.11a system when the wireless terminal 100A conducts communications in the IEEE802.11a system and the W-CDMA system. The filter section 191 is configured with the filter characteristic variable, whereby it can be shared between the case where communications are conducted in the VSF-OFCDM system and the IEEE802.11a system when communications are conducted in the IEEE802.11a system and the W-CDMA system.

The modulation section 144 performs mapping processing for an input signal. When the wireless terminal 100A conducts communications in the VSF-OFCDM system, the modulation section 144 is compatible with QPSK; when the wireless terminal 100A conducts communications in the IEEE802.11a system and the W-CDMA system, the modulation section 144 is compatible with QPSK in the W-CDMA system, so that the modulation section 144 can be shared between the two systems. The modulation section 145 has a similar function to that of the modulation section 144; when the wireless terminal 100A conducts communications in the VSF-OFCDM system, the modulation section 145 is compatible with QPSK; when the wireless terminal 100A conducts communications in the IEEE802.11a system and the W-CDMA system, the modulation section 145 is compatible with BPSK, QPSK, 16QAM, and 64QAM in the IEEE802.11a system. The modulation section 145 is configured to be compatible with BPSK, QPSK, 16QAM, and 64QAM, whereby it can be shared between the two systems.

The error correction code section 146 performs coding processing for an input signal. When the wireless terminal 100A conducts communications in the VSF-OFCDM system, turbo coding and convolutional coding are performed; when the wireless terminal 100A conducts communications in the IEEE802.11a system and the W-CDMA system, turbo coding and convolutional coding compatible with the W-CDMA system are performed, so that the error correction code section 146 can be shared between the two systems. The error correction code section 146 is implemented as a reconfigurable device such as an FPGA and covers the turbo coding and the convolutional coding, whereby more than one coding factor can also be covered. The error correction code section 147 has a similar function to that of the error correction code section 146; when the wireless terminal 100A conducts communications in the VSF-OFCDM system, the error correction code section 147 performs turbo coding and convolutional coding and is compatible with the convolutional coding in the IEEE802.11a system when the wireless terminal 100A conducts communications in the IEEE802.11a system and the W-CDMA system. The error correction code section 147 is configured to be compatible with the turbo coding and the convolutional coding, whereby it can be shared between the two systems.

According to the configuration of the first embodiment described above, the hardware resources compatible with the OFCDM system are used to reconfigure the wireless terminal so as to be compatible with the CDMA system and the OFDM system, whereby the wireless terminal involving small redundancy and compatible with a plurality of communication systems can be configured.

The first D/A section 114, the second D/A section 115, the third D/A section 116, the first A/D section 124, the second A/D section 125, and the third A/D section 126 are provided with the filter function, whereby the filter sections 142, 143, 190, 191, and 192 can also be removed.

To conduct communications in the IEEE802.11a system and the W-CDMA system, the spread code output from the spread code generation section 164 is set to 1 for suppressing inverse spreading in the multiplication section 166, whereby the switches 136 and 137 can also be removed.

Second Embodiment

Figure 7:
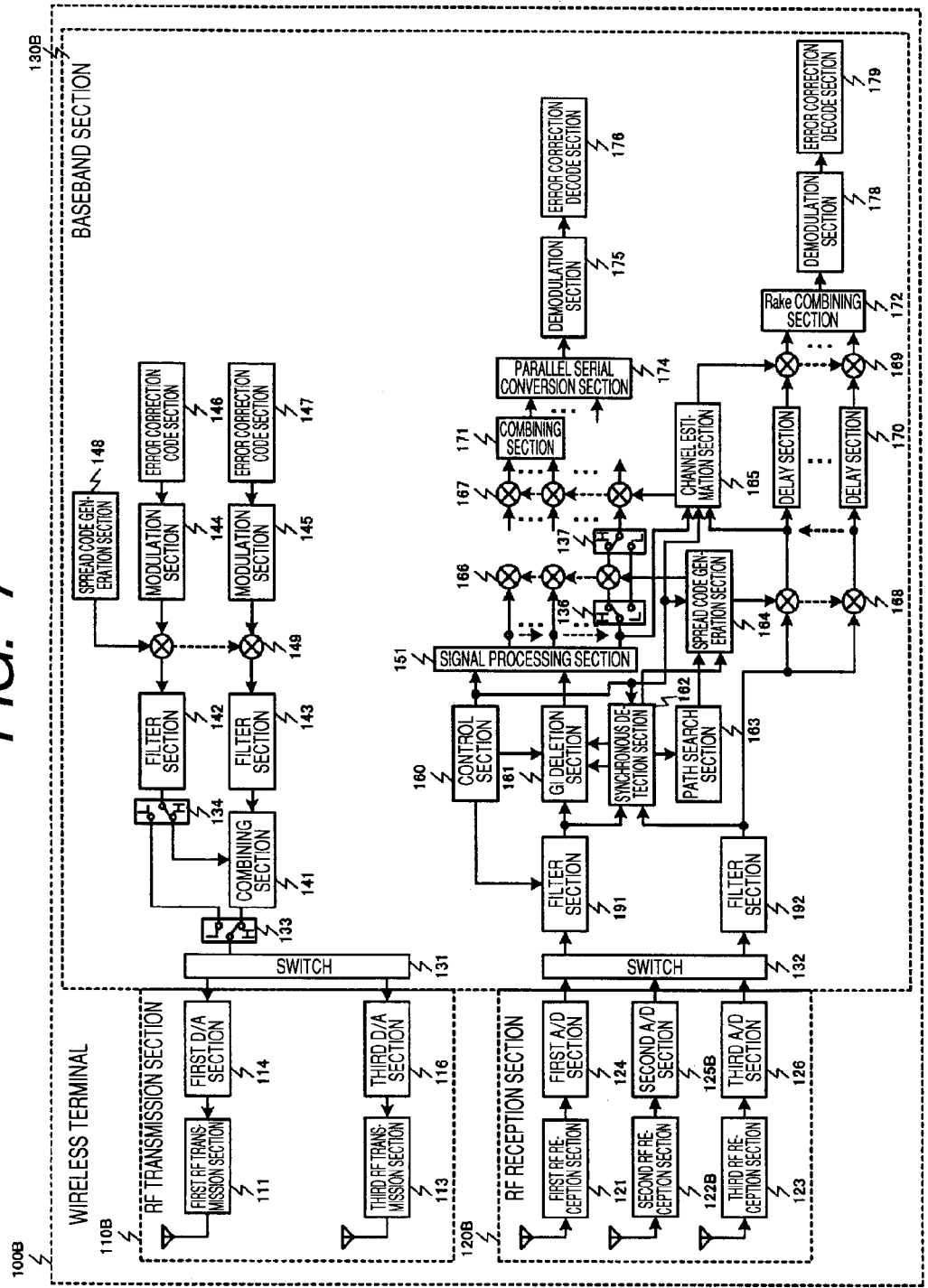
FIG. 7 is a block diagram to show the configuration of a wireless terminal in a second embodiment of the invention.

FIG. 7 is a block diagram to show the configuration of a wireless terminal in a second embodiment of the invention. A wireless terminal 100B of the second embodiment has a reception function conforming to ISDB-T system in place of the transmission-reception function conforming to the IEEE802.11a system in the first embodiment. The ISDB-T system is a digital broadcasting standard and is one kind of OFDM system. In the second embodiment, the case where 1-segment reception in the ISDB-T system is performed will be discussed.

The second embodiment shown in FIG. 7 and the first embodiment shown in FIG. 1 differ in that it does not include the guard interval insertion section 150, the serial parallel conversion section 152, etc., because the transmission function for the ISDB-T system is not required.

A first RF transmission section 111 and a first D/A section 114 in an RF transmission section 110B are an RF section compatible with VSF-OFCDM system. The first D/A section 114 converts an input digital signal modulated according to the VSF-OFCDM system into an analog signal and outputs the analog signal, and the first RF transmission section 111 converts the input analog signal into a radio frequency signal and outputs the radio frequency signal. A third RF transmission section 113 and a third D/A section 116 are an RF section compatible with W-CDMA system. The third D/A section 116 converts an input digital signal modulated according to the W-CDMA system into an analog signal and outputs the analog signal, and the third RF transmission section 113 converts the input analog signal into a radio frequency signal and outputs the radio frequency signal.

A first RF reception section 121 and a first A/D section 124 in the RF reception section 120B are an RF section compatible with the VSF-OFCDM system. The first RF reception section 121 converts an input radio frequency signal according to the VSF-OFCDM system into an analog signal of an intermediate frequency and outputs the analog signal, and the first A/D section 124 converts the input analog signal into a digital signal and outputs the digital signal. A second RF reception section 122B and a second A/D section 125B are an RF section compatible with the ISDB-T system. The second RF reception section 122B converts an input radio frequency signal according to the ISDB-T system into an analog signal of an intermediate frequency and outputs the analog signal, and the second A/D section 125B converts the input analog signal into a digital signal and outputs the digital signal. A third RF reception section 123 and a third A/D section 126 are an RF section compatible with the W-CDMA system. The third RF reception section 123 converts an input radio frequency signal according to the W-CDMA system into an analog signal of an intermediate frequency and outputs the analog signal, and the third A/D section 126 converts the input analog signal into a digital signal and outputs the digital signal.

Switches 131, 132, 133, 134, 136, and 137 are controlled by a control section 160 although connection is not shown in FIG. 7. Each of the switches 133, 134, 136, and 137 is H when the wireless terminal 100B conducts communications in the VSF-OFCDM system; each switch is switched L when the wireless terminal 100B conducts communications in the ISDB-T system and the W-CDMA system. When each of the switches 136 and 137 is H, a signal output from a signal processing section 151 is multiplied by an inverse spread signal output from a spread code generation section 164; when the switch is L, a signal output from the signal processing section 151 is not multiplied by any. The switch 131 switches so that the first D/A section 114 and the switch 133 are connected when the wireless terminal 100B conducts communications in the VSF-OFCDM system and that the third D/A section 116 and the switch 133 are connected when the wireless terminal 100B conducts communications in the ISDB-T system and the W-CDMA system. The switch 132 switches so that the first A/D section 124 and a filter section 191 are connected when the wireless terminal 100B conducts communications in the VSF-OFCDM system and that the second A/D section 125B and the filter section 191 are connected and the third A/D section 126 and a filter section 192 are connected when the wireless terminal 100B conducts communications in the ISDB-T system and the W-CDMA system.

The signal processing section 151 is a block for performing Fourier transform and inverse Fourier transform and when the wireless terminal 100B conducts communications in the VSF-OFCDM system, the signal processing section 151 performs 1024-p Fourier transform for the signal input from a guard interval deletion section 161 and outputs the result to a multiplication section 166 (switch 136). When the wireless terminal 100B conducts communications in the ISDB-T system and the W-CDMA system, the signal processing section 151 performs 128-point (Mode 1), 256-point (Mode 2), or 512-point (Mode 3) Fourier transform for the signal input from the guard interval deletion section 161 and outputs the result to the switch 136. The signal processing section 151 needs only to cover 1024-p, 128-point, 256-point, or 512-point Fourier transform and therefore can execute the processing as radix-4 butterfly computation (Mode 2) or butterfly computation with a base 2 (Mode 1, Mode 3). When the base is 4, the same configuration as that in FIG. 2 is applied. When the wireless terminal 100B conducts communications in the VSF-OFCDM system, butterfly computation sections 1511 and 1512 perform 1024-point FFT. When the wireless terminal 100B conducts communications in the ISDB-T system and the W-CDMA system, the butterfly computation sections 1511 and 1512 perform 256-point FFT. However, the signal processing section 151 is not limited to the radix-4 butterfly computation and can also adopt another configuration if it is a configuration capable of executing 128-point, 256-point, or 512-point Fourier transform and 1024-point Fourier transform.

The guard interval deletion section 161 has a similar function to that of the first embodiment. When the wireless terminal 100B conducts communications in the VSF-OFCDM system, a 226-point guard interval is removed from the digital signal input from the first A/D section 124 through the filter section 191; when the wireless terminal 100B conducts communications in the ISDB-T system and the W-CDMA system, a 32-point guard interval is removed from the digital signal input from the second A/D section 125B through the filter section 191 (when the guard interval length is ⅛ in Mode 2).

According to the configuration of the second embodiment described above, the hardware resources compatible with the OFCDM system are used to reconfigure the wireless terminal so as to be compatible with the CDMA system and the OFDM system, whereby the wireless terminal involving small redundancy and compatible with a plurality of communication systems can be configured.

Third Embodiment

Figure 8:
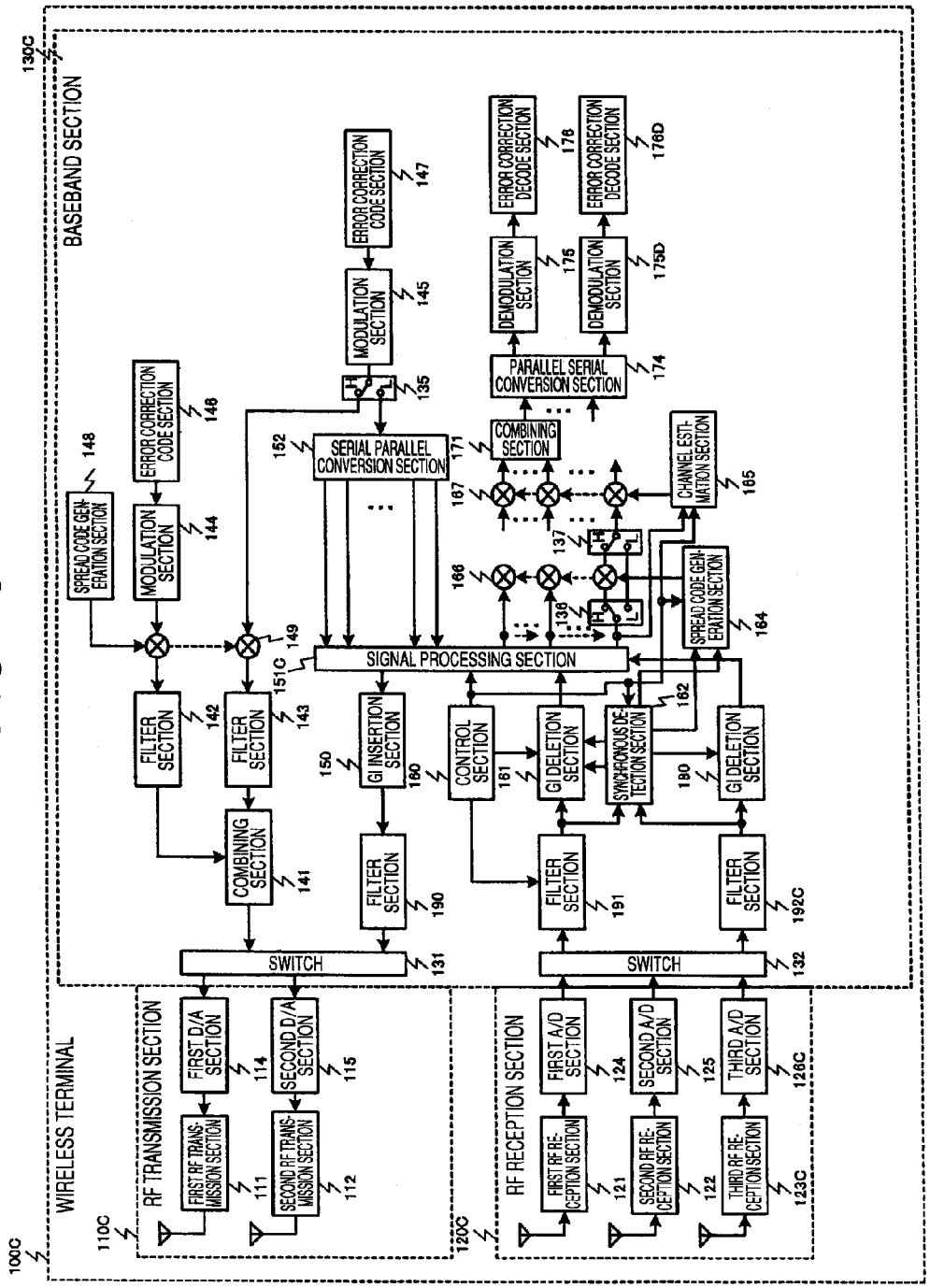
FIG. 8 is a block diagram to show the configuration of a wireless terminal in a third embodiment of the invention.

FIG. 8 is a block diagram to show the configuration of a wireless terminal in a third embodiment of the invention. A wireless terminal 100C of the third embodiment has a reception function conforming to ISDB-T system in place of the transmission-reception function conforming to the W-CDMA system in the first embodiment.

The third embodiment shown in FIG. 8 and the first embodiment shown in FIG. 1 differ in that it does not include the path search section 163, the Rake combining section 172, etc., because the reception function for the W-CDMA system is not required and that it does not include the third RF transmission section 113, the third D/A section 116, etc., because the transmission function for the ISDB-T system is not required.

A first RF transmission section 111 and a first D/A section 114 in an RF transmission section 110C are an RF section compatible with VSF-OFCDM system. The first D/A section 114 converts an input digital signal modulated according to the VSF-OFCDM system into an analog signal and outputs the analog signal, and the first RF transmission section 111 converts the input analog signal into a radio frequency signal and outputs the radio frequency signal. A second RF transmission section 112 and a second D/A section 115 are an RF section compatible with IEEE802.11a system. The second D/A section 115 converts an input digital signal modulated according to the IEEE802.11a system into an analog signal and outputs the analog signal, and the second RF transmission section 112 converts the input analog signal into a radio frequency signal and outputs the radio frequency signal.

A first RF reception section 121 and a first A/D section 124 in the RF reception section 120C are an RF section compatible with the VSF-OFCDM system. The first RF reception section 121 converts an input radio frequency signal according to the VSF-OFCDM system into an analog signal of an intermediate frequency and outputs the analog signal, and the first A/D section 124 converts the input analog signal into a digital signal and outputs the digital signal. A second RF reception section 122 and a second A/D section 125 are an RF section compatible with the IEEE802.11a system. The second RF reception section 122 converts an input radio frequency signal according to the IEEE802.11a system into an analog signal of an intermediate frequency and outputs the analog signal, and the second A/D section 125 converts the input analog signal into a digital signal and outputs the digital signal. A third RF reception section 123C and a third A/D section 126C are an RF section compatible with the ISDB-T system. The third RF reception section 123C converts an input radio frequency signal according to the ISDB-T system into an analog signal of an intermediate frequency and outputs the analog signal, and the third A/D section 126C converts the input analog signal into a digital signal and outputs the digital signal.

Switches 131, 132, 135, 136, and 137 are controlled by a control section 160 although connection is not shown in FIG. 8. Each of the switches 135, 136, and 137 is H when the wireless terminal 100C conducts communications in the VSF-OFCDM system; each switch is switched L when the wireless terminal 100C conducts communications in the IEEE802.11a system and the ISDB-T system. When each of the switches 136 and 137 is H, a signal output from a signal processing section 151 is multiplied by an inverse spread signal output from a spread code generation section 164; when the switch is L, a signal output from the signal processing section 151 is not multiplied by any. The switch 131 switches so that the first D/A section 114 and a combining section 141 are connected when the wireless terminal 100C conducts communications in the VSF-OFCDM system and that the second D/A section 115 and a filter section 190 are connected when the wireless terminal 100C conducts communications in the IEEE802.11a system and the ISDB-T system. The switch 132 switches so that the first A/D section 124 and a filter section 191 are connected when the wireless terminal 100C conducts communications in the VSF-OFCDM system and that the second A/D section 125 and the filter section 191 are connected and the third A/D section 126C and a filter section 192C are connected when the wireless terminal 100C conducts communications in the IEEE802.11a system and the ISDB-T system.

The signal processing section 151 C is a block for performing Fourier transform and inverse Fourier transform and when the wireless terminal 100C conducts communications in the VSF-OFCDM system, the signal processing section 151C performs 1024-point Fourier transform for the signal input from a guard interval deletion section 161 and outputs the result to a multiplication section 166 (switch 136). When the wireless terminal 100C conducts communications in the IEEE802.11a system and the ISDB-T system, the signal processing section 151C performs 64-point inverse Fourier transform for the signal input from a serial parallel conversion section 152 and outputs the result to a guard interval insertion section 150 and performs 64-point Fourier transform for the signal input from a guard interval deletion section 161 and outputs the result to the switch 136 and performs 128-point (Mode 1), 256-point (Mode 2), or 512-point (Mode 3) Fourier transform for the signal input from a guard interval deletion section 180. In Mode 2, the signal processing section 151C needs only to cover 1024-point Fourier transform, 256-point Fourier transform, and 64-point Fourier transform and inverse Fourier transform and therefore can execute the processing as radix-4 butterfly computation (Mode 2).

Figure 9:
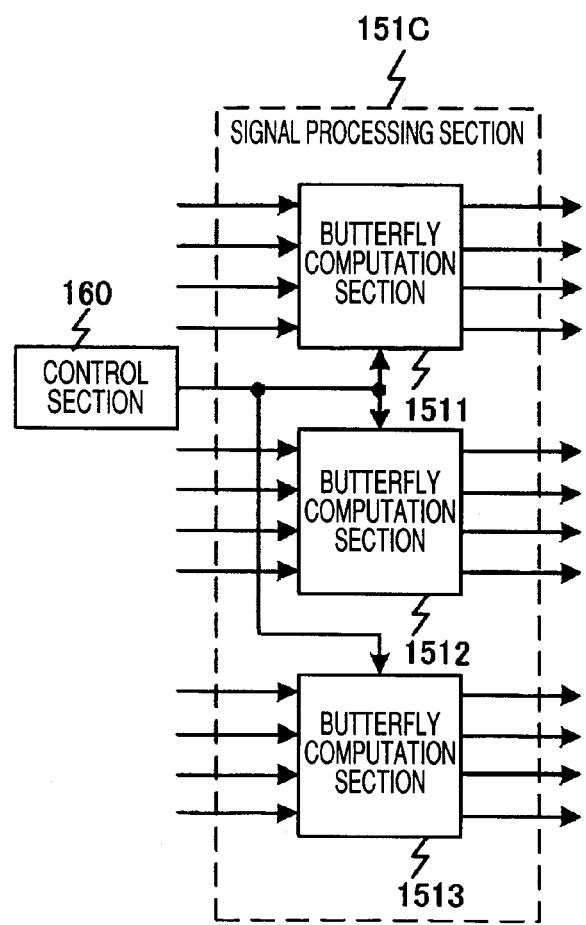
FIG. 9 is a drawing to show a configuration example of a signal processing section in the third embodiment of the invention.

FIG. 9 shows a configuration example of the signal processing section 151C. In FIG. 9, the signal processing section 151C has a butterfly computation section 1511, a butterfly computation section 1512, and a butterfly computation section 1513 for executing radix-4 butterfly computation. When the wireless terminal 100C conducts communications in the VSF-OFCDM system, the butterfly computation sections 1511, 1512, and 1513 perform 1024-point FFT. When the wireless terminal 100C conducts communications in the IEEE802.11a system and the ISDB-T system, the butterfly computation section 1511 performs 64-point IFFT, the butterfly computation section 1512 performs 64-point FFT, and the butterfly computation section 1513 performs 256-point FFT. However, the signal processing section 151C is not limited to the radix-4 butterfly computation and is not limited to the configuration example in FIG. 9 if it has a configuration capable of executing 64-point inverse Fourier transform and Fourier transform and 128-point, 256-point, or 512-point Fourier transform, 1024-point Fourier transform.

According to the configuration of the third embodiment described above, the hardware resources compatible with the OFCDM system are used to reconfigure the wireless terminal so as to be compatible with a plurality of OFDM systems, whereby the wireless terminal involving small redundancy and compatible with a plurality of communication systems can be configured.

Fourth Embodiment

Figure 10:
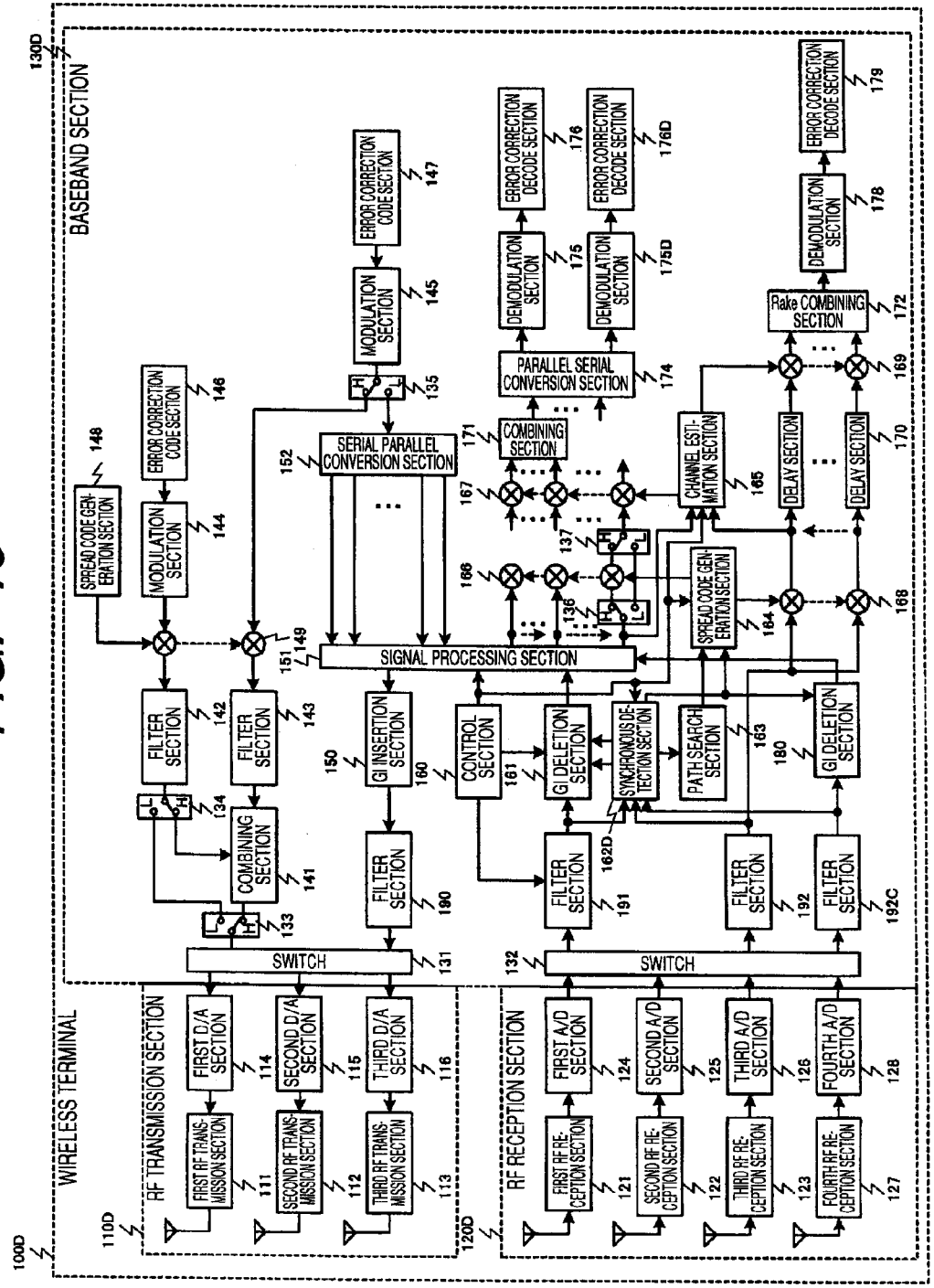
FIG. 10 is a block diagram to show the configuration of a wireless terminal in a fourth embodiment of the invention.

FIG. 10 is a block diagram to show the configuration of a wireless terminal in a fourth embodiment of the invention. A wireless terminal 100D of the fourth embodiment is provided by adding a reception function conforming to ISDB-T system to the configuration of the first embodiment.

The fourth embodiment shown in FIG. 10 and the first embodiment shown in FIG. 1 differ in that a fourth RF reception section 127, a fourth A/D section 128, and the like are added because the reception function for the ISDB-T system is added.

A first RF reception section 121 and a first A/D section 124 in the RF reception section 120D are an RF section compatible with VSF-OFCDM system. The first RF reception section 121 converts an input radio frequency signal according to the VSF-OFCDM system into an analog signal of an intermediate frequency and outputs the analog signal, and the first A/D section 124 converts the input analog signal into a digital signal and outputs the digital signal. A second RF reception section 122 and a second A/D section 125 are an RF section compatible with IEEE802.11a system. The second RF reception section 122 converts an input radio frequency signal according to the IEEE802.11a system into an analog signal of an intermediate frequency and outputs the analog signal, and the second A/D section 125 converts the input analog signal into a digital signal and outputs the digital signal. A third RF reception section 123 and a third A/D section 126 are an RF section compatible with W-CDMA system. The third RF reception section 123 converts an input radio frequency signal according to the W-CDMA system into an analog signal of an intermediate frequency and outputs the analog signal, and the third A/D section 126 converts the input analog signal into a digital signal and outputs the digital signal. A fourth RF reception section 127 and a fourth A/D section 128 are an RF section compatible with the ISDB-T system. The fourth RF reception section 127 converts an input radio frequency signal according to the ISDB-T system into an analog signal of an intermediate frequency and outputs the analog signal, and the fourth A/D section 128 converts the input analog signal into a digital signal and outputs the digital signal.

A switch 132 switches so that the first A/D section 124 and a filter section 191 are connected when the wireless terminal 100C conducts communications in the VSF-OFCDM system and that the second A/D section 125 and the filter section 191 are connected, the third A/D section 126 and a filter section 192 are connected, and the fourth A/D section 128 and a filter section 192C are connected when the wireless terminal 100C conducts communications in the IEEE802.11a system, the W-CDMA system, and the ISDB-T system.

Figure 11:
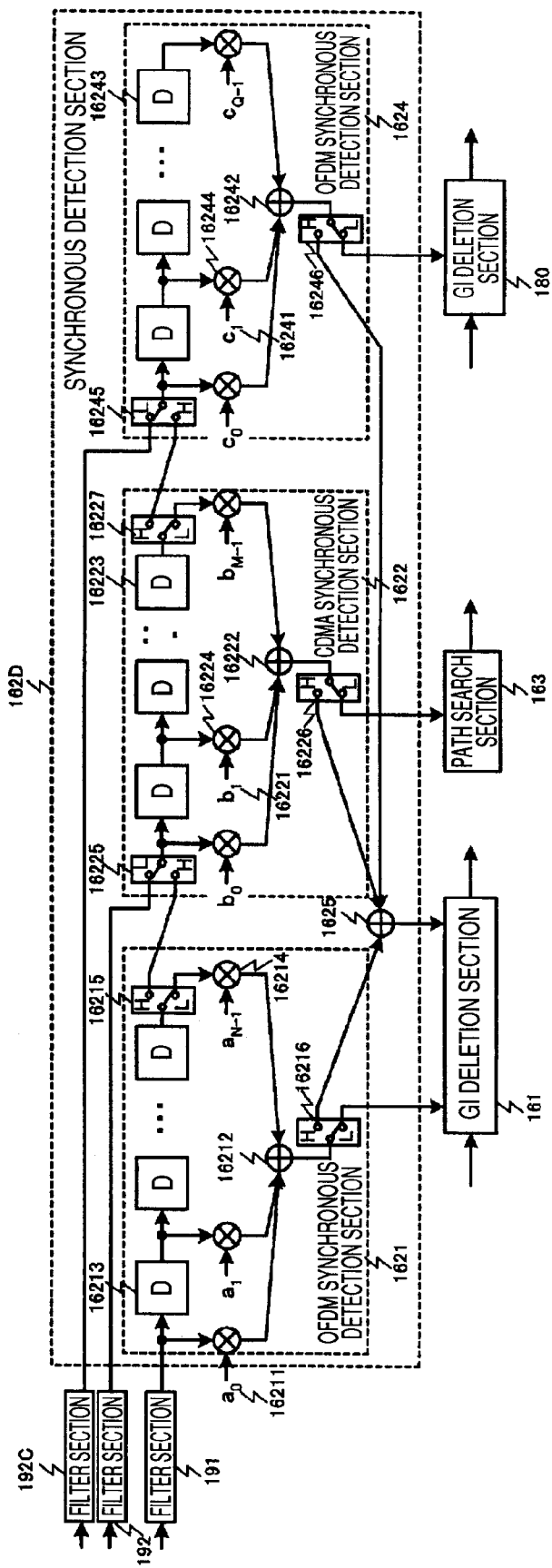
FIG. 11 is a drawing to show a configuration example of a synchronous detection section in the fourth embodiment of the invention.

FIG. 11 shows a configuration example of a synchronous detection section 162D. FIG. 11 shows the configuration for detecting the timing based on auto correlation when the number of taps (=A) required for performing synchronous processing when communications are conducted in the VSF-OFCDM system is equal to the sum total of the number of taps (=N) required for performing synchronous processing in the IEEE802.11a system, the number of taps (=M) required for performing synchronous processing in the W-CDMA system, and the number of taps (=Q) required for performing synchronous processing in the ISDB-T system (A=N+M+Q) when communications are conducted in the IEEE802.11a system, the W-CDMA system, and the ISDB-T system.

The synchronous detection section 162D further has an OFDM synchronous detection section 1624 and a switch 16227 in the configuration of the first embodiment. The OFDM synchronous detection section 1624 has a tap coefficient 16241, an addition section 16242, a delay section 16243, a multiplication section 16244, a switch 16245, and a switch 16246. Each of switches 16215, 16216, 16225, 16226, 16227, 16245, and 16246 is H when the wireless terminal 100D conducts communications in the VSF-OFCDM system; each switch is switched L when the wireless terminal 100D conducts communications in the IEEE802.11a system, the W-CDMA system, and the ISDB-T system.

Tap coefficients 16211, 16221, and 16241 are switched to coefficients corresponding to the communication systems with switching of the switches. To conduct communications in the IEEE802.11a system, the W-CDMA system, and the ISDB-T system, the digital signal (IEEE802.11a system) output from the filter section 191 is input to a delay section 16213, the digital signal (W-CDMA system) output from the filter section 192 is input to a delay section 16223, the digital signal (ISDB-T system) output from the filter section 192C is input to the delay section 16243, and timing information is output from the switch 16216, the switch 16226, and the switch 16246 of an OFDM synchronous detection section 1621, a CDMA synchronous detection section 1622, and the OFDM synchronous detection section 1624. To conduct communications in the VSF-OFCDM system, the digital signal (VSF-OFCDM system) input from the filter section 191 is input to the delay section 16213, the delay section 16223, and the delay section 16243, the signals output from the OFDM synchronous detection section 1621, the CDMA synchronous detection section 1622, and the OFDM synchronous detection section 1624 are added by an addition section 1625, and timing information is output.

According to the configuration of the fourth embodiment described above, the hardware resources compatible with the OFCDM system are used to reconfigure the wireless terminal so as to be compatible with the CDMA system and a plurality of OFDM systems, whereby the wireless terminal involving small redundancy and compatible with a plurality of communication systems can be configured.

Fifth Embodiment

Figure 12:
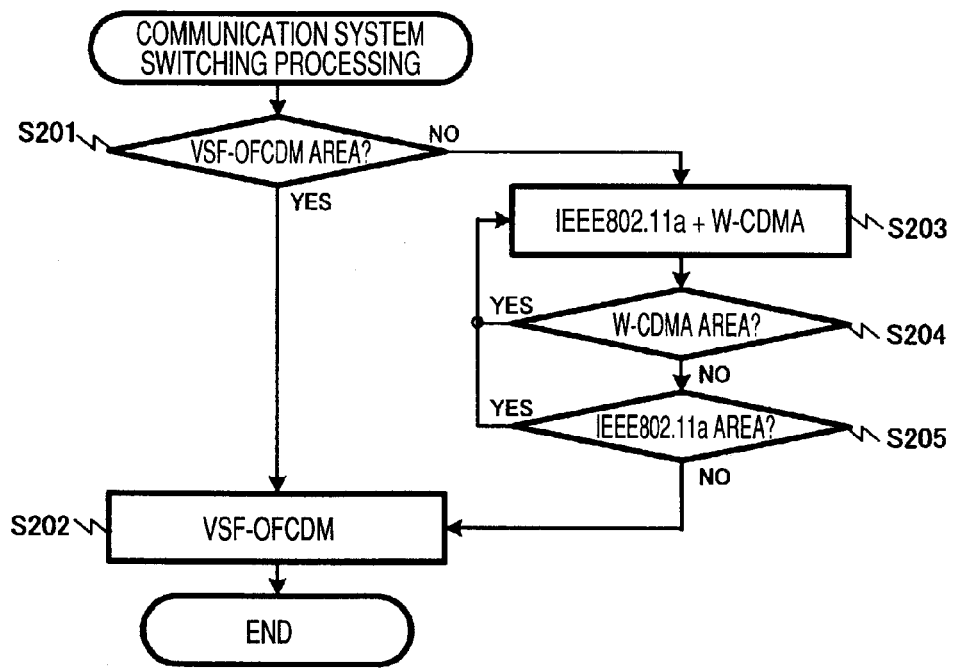
FIG. 12 is a flowchart to show the communication system switching operation in the fifth embodiment of the invention.

In a fifth embodiment, a switching method between the case where the wireless terminal 100A conducts communications in the VSF-OFCDM system and the case where the wireless terminal 100A conducts communications in the IEEE802.11a system and the W-CDMA system in the configuration as in the first embodiment will be discussed. FIG. 12 is a flowchart to show the communication system switching operation of wireless terminal in the fifth embodiment of the invention.

Processing starts with the configuration wherein the wireless terminal 100A is compatible with the VSF-OFCDM system. At step S201, the wireless terminal 100A checks whether or not it is within the communication area of the VSF-OFCDM system from the demodulation result, etc. If the wireless terminal 100A determines that it is outside the communication area of the VSF-OFCDM system, the wireless terminal 100A goes to step S203; if the wireless terminal 100A determines that it is within the communication area, the wireless terminal 100A goes to step S202 and the processing terminates (remaining in the VSF-OFCDM system).

At step S203, the configuration of the wireless terminal 100A is switched from the VSF-OFCDM system to the IEEE802.11a system and the W-CDMA system. At step S204, the wireless terminal 100A checks whether or not it is within the communication area of the W-CDMA system from the demodulation result, etc. If the wireless terminal 100A determines that it is outside the communication area of the W-CDMA system, the wireless terminal 100A goes to step S205; if the wireless terminal 100A determines that it is within the communication area, the wireless terminal 100A returns to step S203 (remaining in the IEEE802.11a system and the W-CDMA system). At step S205, the wireless terminal 100A checks whether or not it is within the communication area of the IEEE802.11a system from the demodulation result, etc. If the wireless terminal 100A determines that it is outside the communication area of the IEEE802.11a system, the wireless terminal 100A goes to step S202; if the wireless terminal 100A determines that it is within the communication area, the wireless terminal 100A returns to step S203 (remaining in the IEEE802.11a system and the W-CDMA system). However, the order of steps S204 and S205 can also be changed.

The procedure shown in the flowchart of FIG. 12 can also be used to switch between the case where the wireless terminal conducts communications in the VSF-OFCDM system and the case where the wireless terminal conducts communications in the IEEE802.11a system and the ISDB-T system, switch between the case where the wireless terminal conducts communications in the VSF-OFCDM system and the case where the wireless terminal conducts communications in the W-CDMA system and the ISDB-T system, and switch between the case where the wireless terminal conducts communications in the VSF-OFCDM system and the case where the wireless terminal conducts communications in the IEEE802.11a system, the W-CDMA system, and the ISDB-T system.

According to the configuration of the fifth embodiment described above, the hardware resources compatible with the OFCDM system are used to reconfigure the wireless terminal so as to be compatible with the CDMA system and the OFDM system, whereby the wireless terminal involving small redundancy and compatible with a plurality of communication systems can be configured.

Sixth Embodiment

Figure 13:
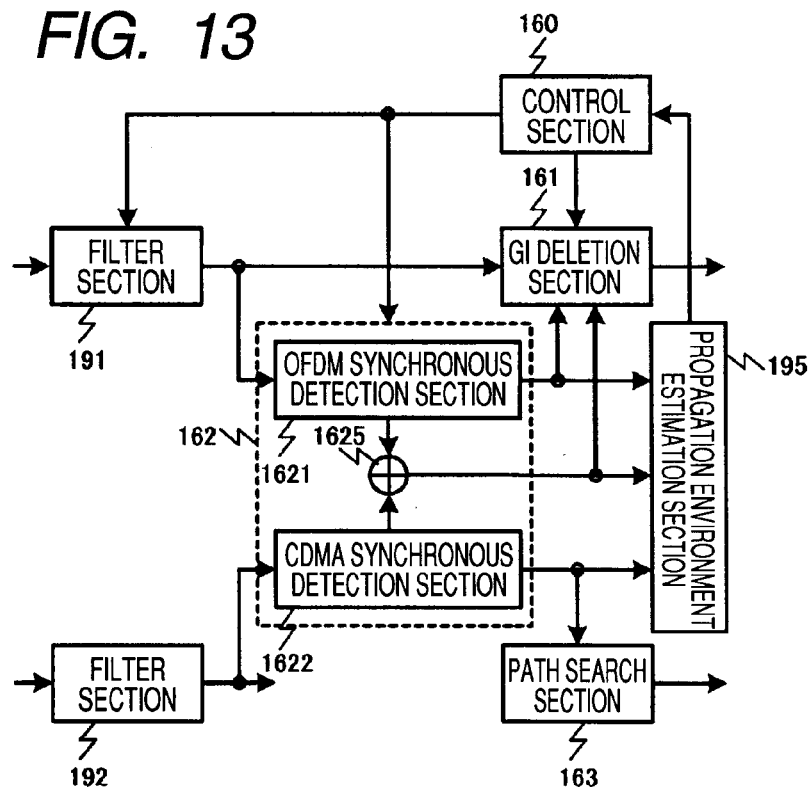
FIG. 13 is a block diagram to show the configuration of a wireless terminal in a sixth embodiment of the invention.
Figure 14:
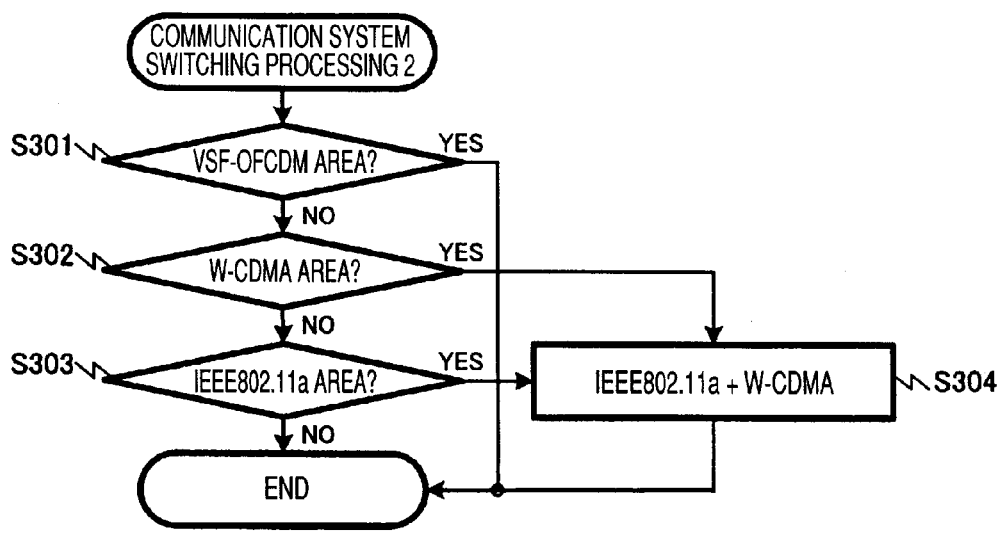
FIG. 14 is a flowchart to show the communication system switching operation in the sixth embodiment of the invention.
Figure 15:
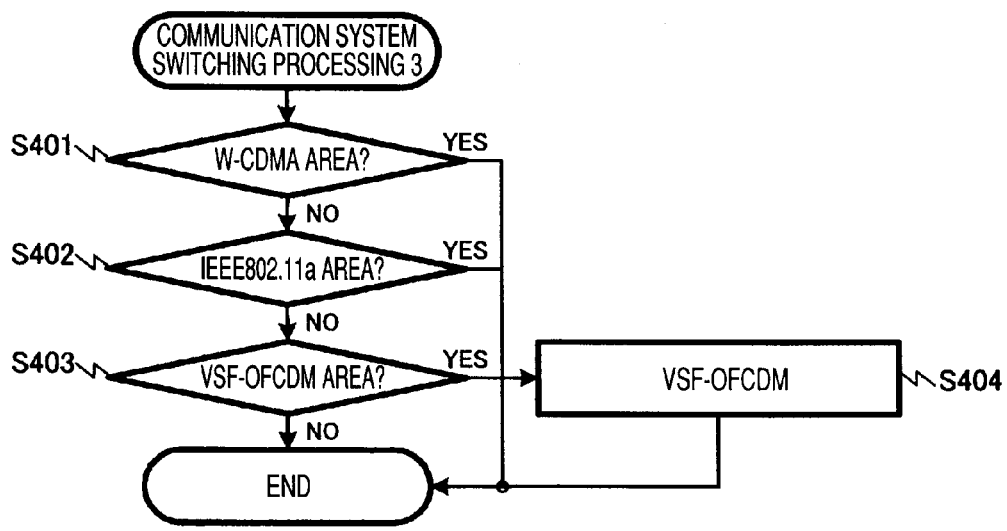
FIG. 15 is a flowchart to show the communication system switching operation in the sixth embodiment of the invention.
Figure 16:
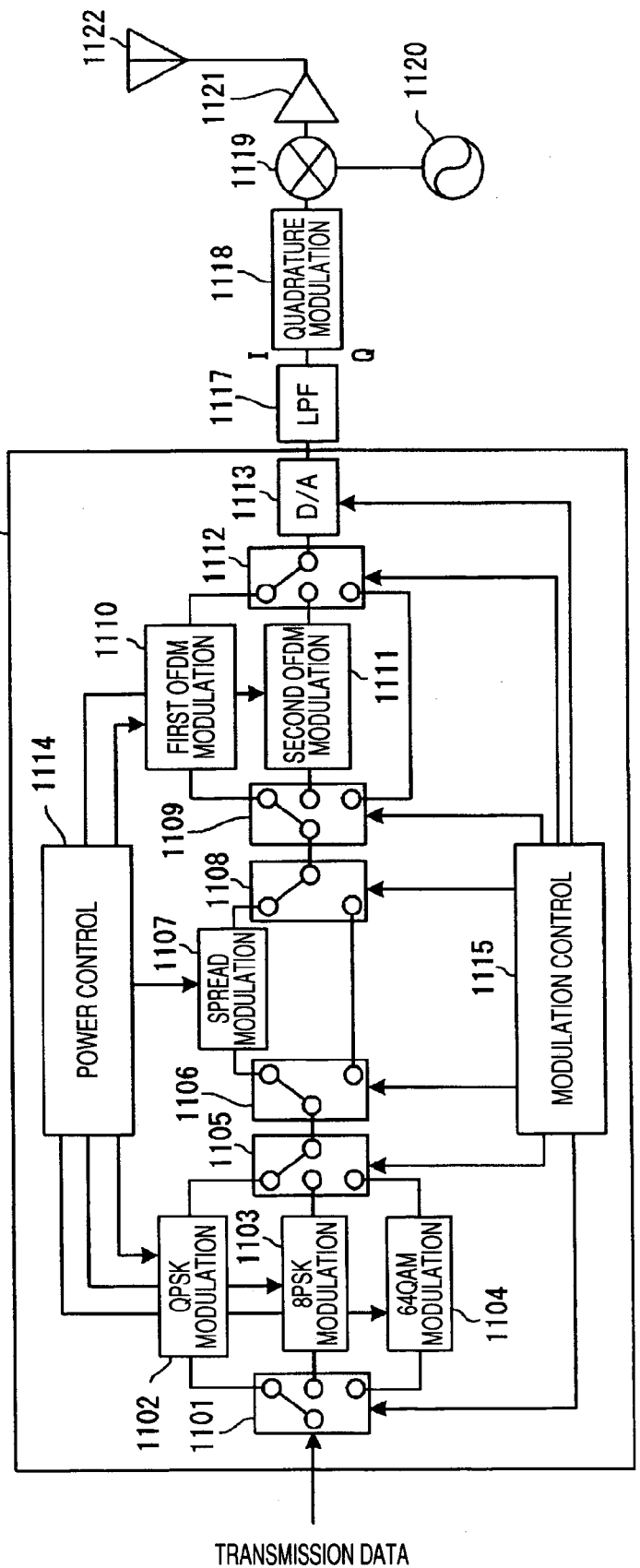
FIG. 16 is a block diagram to show the configuration of a wireless terminal in a related art.

In a sixth embodiment, a switching method between the case where the wireless terminal 100A conducts communications in the VSF-OFCDM system and the case where the wireless terminal 100A conducts communications in the IEEE802.11a system and the W-CDMA system in the configuration as in the first embodiment will be discussed. FIG. 13 is a block diagram to show the configuration of the main part of a wireless terminal in the sixth embodiment of the invention. FIGS. 14 and 15 are flowcharts to show the communication system switching operation of the wireless communication unit in the sixth embodiment of the invention.

If the wireless terminal 100A has a propagation environment estimation section 195 and has a configuration as shown in FIG. 13, the propagation environment estimation section 195 makes a threshold determination, etc., from a delay profile output from a synchronous detection section 162, whereby it is made possible to determine whether or not the wireless terminal 100A is within the area of each communication system.

If processing starts with the configuration wherein the wireless terminal 100A is compatible with the VSF-OFCDM system (communication system switching processing 2), at step S301 shown in FIG. 14, the wireless terminal 100A checks whether or not it is within the communication area of the VSF-OFCDM system from the delay profile output from an addition section 1625 of the synchronous detection section 162. If the wireless terminal 100A determines that it is within the communication area of the VSF-OFCDM system, the wireless terminal 100A maintains the configuration compatible with the VSF-OFCDM system and terminates the processing. If the wireless terminal 100A determines at step S301 that it is outside the communication area of the VSF-OFCDM system, a switch of the synchronous detection section 162 is switched L from H and the switch 132 in FIG. 1 is switched so that a second A/D section 125 and a filter 191 are connected, and the wireless terminal 100A checks whether or not it is within the communication area of the W-CDMA system from a delay profile output from a CDMA synchronous detection section 1622 (step S302). If the wireless terminal 100A determines that it is within the communication area of the W-CDMA system, at step S304 the wireless terminal 100A switches to the configuration compatible with the IEEE802.11a system and the W-CDMA system and terminates the processing. If the wireless terminal 100A determines at step S302 that it is outside the communication area of the W-CDMA system, the wireless terminal 100A checks whether or not it is within the communication area of the IEEE802.11a system from a delay profile output from an OFDM synchronous detection section 1621 (step S303). If the wireless terminal 100A determines that it is within the communication area of the IEEE802.11a system, at step S304 the wireless terminal 100A switches to the configuration compatible with the IEEE802.11a system and the W-CDMA system and terminates the processing. If the wireless terminal 100A determines at step S303 that it is outside the communication area of the IEEE802.11a system, the wireless terminal 100A maintains the configuration compatible with the VSF-OFCDM system and terminates the processing (the switch of the synchronous detection section 162 is restored H from L and the connection of the switch 132 is also restored to the former state).

If processing starts with the configuration wherein the wireless terminal 100A is compatible with the IEEE802.11a system and the W-CDMA system (communication system switching processing 3), at step S401 shown in FIG. 15, the wireless terminal 100A checks whether or not it is within the communication area of the W-CDMA system from the delay profile output from the CDMA synchronous detection section 1622 of the synchronous detection section 162. If the wireless terminal 100A determines that it is within the communication area of the W-CDMA system, the wireless terminal 100A maintains the configuration compatible with the IEEE802.11a system and the W-CDMA system and terminates the processing. If the wireless terminal 100A determines at step S401 that it is outside the communication area of the W-CDMA system, the wireless terminal 100A checks whether or not it is within the communication area of the IEEE802.11a system from the delay profile output from the OFDM synchronous detection section 1621 (step S402). If the wireless terminal 100A determines that it is within the communication area of the IEEE802.11a system, the wireless terminal 100A maintains the configuration compatible with the IEEE802.11a system and the W-CDMA system and terminates the processing. If the wireless terminal 100A determines at step S402 that it is outside the communication area of the IEEE802.11a system, the switch of the synchronous detection section 162 is switched H from L and the switch 132 in FIG. 1 is switched so that a first A/D section 124 and the filter 191 are connected, and the wireless terminal 100A checks whether or not it is within the communication area of the VSF-OFCDM system from the delay profile output from the addition section 1625 (step S403). If the wireless terminal 100A determines that it is within the communication area of the VSF-OFCDM system, at step S404 the wireless terminal 100A switches to the configuration compatible with the VSF-OFCDM system and terminates the processing. If the wireless terminal 100A determines at step S403 that it is outside the communication area of the VSF-OFCDM system, the wireless terminal 100A maintains the configuration compatible with the IEEE802.11a system and the W-CDMA system and terminates the processing (the switch of the synchronous detection section 162 is restored L from H and the connection of the switch 132 is also restored to the former state).

According to the configuration of the sixth embodiment described above, if the wireless terminal 100A determines that it is outside the communication area of the VSF-OFCDM system and that it is within the communication area of the W-CDMA system or the IEEE802.11a system, the wireless terminal 100A is reconfigured to the configuration compatible with the IEEE802.11a system and the W-CDMA system. If the wireless terminal 100A determines that it is outside the communication area of the W-CDMA system or the IEEE802.11a system and that it is within the communication area of the VSF-OFCDM system, the wireless terminal 100A is reconfigured to the configuration compatible with the VSF-OFCDM system. At the time, the area of each communication system can be determined simply by changing some switches, so that the hardware can be reconfigured efficiently.

As the propagation environment estimation section 195 has a path search function for the CDMA system, path search section 163 can also be removed.

In the first to sixth embodiments, the VSF-OFCDM system has been described as an example of the OFCDM system. A general wireless terminal compatible with the OFCDM system has an OFCDM system configuration for both transmission and reception and thus the hardware resources more than those of the VSF-OFCDM system are required. Therefore, the general wireless terminal compatible with the OFCDM system can also be reconfigured to the configuration compatible with both the CDMA system and the OFDM system described in the embodiment. The CDMA system can also be shared for a system which is not the W-CDMA system and the OFDM system can also be shared for a system which is not the IEEE802.11a system or the ISDB-T system. As for the RF transmission section 110 and the RF reception section 120, antenna, RF transmission section, RF reception section, D/A section, and A/D section can also be shared between transmission and reception or among a plurality of communication systems. Further, the signal processing section 151 and the signal processing section 151C are configured so as to cover FFT and IFFT of a larger number of points than 1024 points, whereby the wireless terminal can also be applied to 13-segment reception of ISDB-T or a broadcast system of the OFDM system other than ISDB-T.

According to the configuration of the embodiment described above, the hardware resources of the wireless terminal of the OFCDM system having a large hardware scale are used to reconfigure the wireless terminal so as to be compatible with the OFDM system and the CDMA system, whereby the wireless terminal involving small redundancy and compatible with a plurality of communication systems can be realized.

When the wireless communication system makes a transition from the previous generation to the next generation, the cover area is narrow as compared with that of the new-generation system at the introduction time of the new-generation system and the transition to the new generation takes a time; this is a problem. To solve this problem, the embodiments are compatible with the OFCDM system on which attention is focused as the wireless communication system of the fourth-generation mobile telephone and the CDMA system of the third-generation wireless communication system, so that the transition of the wireless communication system from the previous generation to the next generation can be facilitated a preferred wireless terminal across the generations can be realized.

While the invention has been described in detail with reference to the specific embodiments, it will be obvious to those skilled in the art that various changes and modifications can be made without departing from the spirit and the scope of the invention. This application is based on Japanese Patent Application (No. 2005-039192) filed on Feb. 16, 2005 and Japanese Patent Application (No. 2005-337346) filed on Nov. 22, 2005, which is incorporated herein by reference.

INDUSTRIAL APPLICABILITY

The invention has the advantage that the hardware resources compatible with one system can be used to realize a configuration of small redundancy to be compatible with a plurality of systems, and is useful for a wireless terminal, a communication system switching method, etc., compatible with a plurality of communication systems.

The invention claimed is:

1. A wireless terminal comprising:
   hardware resources of a wireless terminal compatible with an OFCDM (Orthogonal Frequency And Code Division Multiplexing) system,
   said wireless terminal being reconfigured from a configuration compatible with the OFCDM system to a configuration that is concurrently compatible to communicate with both of an OFDM (Orthogonal Frequency Division Multiplexing) system and a CDMA (Code Division Multiple Access) system with another wireless terminal using common hardware resources of the wireless terminal that are compatible with the OFCDM system, wherein the wireless terminal compatible with the OFCDM system has a synchronous detection section and said synchronous detection section performs synchronous detection compatible with all of the OFCDM system, the OFDM system, and the CDMA system, wherein
   said synchronous detection section comprises a first synchronous detection section for the OFDM system, a second synchronous detection section for the CDMA system and an adder, and
   said first synchronous detection section for the OFDM system and said second synchronous detection section for the CDMA system output signals independently when said wireless terminal is in the configuration that is concurrently compatible to communicate with both of the OFDM system and the CDMA system, whereas said first synchronous detection section for the OFDM system and said second synchronous detection section for the CDMA system output signals to said adder so that said adder adds the output signals to each other when said wireless terminal is in the configuration compatible with the OFCDM system.

2. The wireless terminal as claimed in claim 1, wherein the OFCDM system is a VSF-OFCDM system.

3. The wireless terminal as claimed in claim 1, wherein the CDMA system is a W-CDMA system.

4. The wireless terminal as claimed in claim 1, wherein the OFDM system is an IEEE802.11a system.

5. The wireless terminal as claimed in claim 1, wherein the OFDM system is an ISDB-T system.

6. A communication system switching method in a wireless terminal comprising:
   hardware resources of a wireless terminal compatible with an OFCDM (Orthogonal Frequency And Code Division Multiplexing) system,
   said communication system switching method comprising reconfiguring from a configuration compatible with the OFCDM system to a configuration that is concurrently compatible to communicate with both of an OFDM (Orthogonal Frequency Division Multiplexing) system and a CDMA (Code Division Multiple Access) system with another wireless terminal, using common hardware resources of the wireless terminal that are compatible with the OFCDM system, wherein the wireless terminal compatible with the OFCDM system has a synchronous detection section and said synchronous detection section performs synchronous detection compatible with all of the OFCDM system, the OFDM system, and the CDMA system, wherein
   said synchronous detection section comprises a first synchronous detection section for the OFDM system, a second synchronous detection section for the CDMA system and an adder, and
   said first synchronous detection section for the OFDM system and said second synchronous detection section for the CDMA system output signals independently when said wireless terminal is in the configuration that is concurrently compatible to communicate with both of the OFDM system and the CDMA system, whereas said first synchronous detection section for the OFDM system and said second synchronous detection section for the CDMA system output signals to said adder so that said adder adds the output signals to each other when said wireless terminal is in the configuration compatible with the OFCDM system.

* * * * *

UNITED STATES PATENT AND TRADEMARK OFFICE
CERTIFICATE OF CORRECTION

PATENT NO.       : 8,098,625 B2  
APPLICATION NO.  : 11/568773  
DATED            : January 17, 2012  
INVENTOR(S)      : Kentaro Miyano et al.

Page 1 of 1

It is certified that error appears in the above-identified patent and that said Letters Patent is hereby corrected as shown below:

In column 13, line 21, delete "p" and insert --point--

Signed and Sealed this  
Twenty-ninth Day of May, 2012

David J. Kappos  
*Director of the United States Patent and Trademark Office*